United States Patent
Arms et al.

(10) Patent No.: US 8,024,980 B2
(45) Date of Patent: Sep. 27, 2011

(54) INDEPENDENTLY CALIBRATED WIRELESS STRUCTURAL LOAD SENSOR

(75) Inventors: Steven W Arms, Williston, VT (US); Christopher P. Townsend, Shelburne, VT (US); David L. Churchill, Burlington, VT (US)

(73) Assignee: Microstrain, Inc., Williston, VT (US)

( * ) Notice: Subject to any disclaimer, the term of this patent is extended or adjusted under 35 U.S.C. 154(b) by 193 days.

(21) Appl. No.: 12/360,111

(22) Filed: Jan. 26, 2009

(65) Prior Publication Data

US 2009/0210173 A1    Aug. 20, 2009

Related U.S. Application Data

(60) Provisional application No. 61/062,140, filed on Jan. 24, 2008.

(51) Int. Cl.
*G01B 7/16* (2006.01)
*F16B 31/02* (2006.01)

(52) U.S. Cl. .......................................... 73/763; 73/761
(58) Field of Classification Search ............. 73/760–860
See application file for complete search history.

(56) References Cited

U.S. PATENT DOCUMENTS

| | | | |
|---|---|---|---|
| 3,695,096 A | 10/1972 | Kutsay | |
| 4,165,637 A * | 8/1979 | Kooman | 73/862.631 |
| RE30,183 E * | 1/1980 | Popenoe | 73/761 |
| 4,283,941 A | 8/1981 | Kutsay | |
| 4,364,280 A | 12/1982 | Kutsay | |
| 4,576,053 A * | 3/1986 | Hatamura | 73/862.629 |
| 4,630,490 A * | 12/1986 | Malicki | 73/862.629 |
| 5,318,459 A * | 6/1994 | Shields | 439/527 |
| 5,887,351 A | 3/1999 | Arms et al. | |
| 5,974,893 A * | 11/1999 | Balcarek et al. | 73/714 |
| 6,204,771 B1 * | 3/2001 | Ceney | 340/665 |
| 6,529,127 B2 | 3/2003 | Townsend et al. | |
| 6,629,446 B2 | 10/2003 | Parker | |
| 6,791,465 B2 * | 9/2004 | Blagin et al. | 340/665 |
| 6,871,413 B1 | 3/2005 | Arms et al. | |
| 7,081,693 B2 | 7/2006 | Hamel et al. | |
| 7,143,004 B2 | 11/2006 | Townsend et al. | |
| 7,170,201 B2 | 1/2007 | Hamel et al. | |
| 7,188,535 B1 | 3/2007 | Spletzer | |
| 7,658,096 B2 * | 2/2010 | Pinto et al. | 73/73 |
| 7,668,667 B2 | 2/2010 | Robb et al. | |
| 7,781,943 B1 | 8/2010 | Hamel et al. | |
| 2001/0033187 A1 | 10/2001 | Hamel et al. | |

(Continued)

FOREIGN PATENT DOCUMENTS

WO    WO/2006/067442 A1    6/2006

OTHER PUBLICATIONS

S. Moon & C. Simmerman, "The Art of Helicopter Usage Spectrum Dev.", Am. Helicopter Soc. (AHS) 61st Annual Forum, Grapevine, TX Jun. 1-3, 2005.

(Continued)

*Primary Examiner* — Max Noori
(74) *Attorney, Agent, or Firm* — James Marc Leas

(57) ABSTRACT

A device includes a removable load element. The removable load element includes a pin portion and a housing portion. The pin portion extends from the housing portion. The pin portion includes a sensor. The housing portion includes an electronic circuit connected to the sensor.

22 Claims, 16 Drawing Sheets

U.S. PATENT DOCUMENTS

| | | | |
|---|---|---|---|
| 2002/0024450 A1 | 2/2002 | Townsend et al. |
| 2002/0190785 A1 | 12/2002 | Hamel et al. |
| 2004/0078662 A1 | 4/2004 | Hamel et al. |
| 2005/0017602 A1 | 1/2005 | Arms et al. |
| 2005/0105231 A1 | 5/2005 | Hamel et al. |
| 2005/0116544 A1 | 6/2005 | Hamel et al. |
| 2005/0116545 A1 | 6/2005 | Hamel et al. |
| 2005/0140212 A1 | 6/2005 | Hamel et al. |
| 2005/0146220 A1 | 7/2005 | Hamel et al. |
| 2005/0210340 A1 | 9/2005 | Townsend et al. |
| 2006/0103534 A1 | 5/2006 | Arms et al. |
| 2006/0213278 A1 | 9/2006 | Arms et al. |
| 2007/0114890 A1 | 5/2007 | Churchill et al. |
| 2007/0144396 A1 | 6/2007 | Hamel et al. |
| 2008/0036617 A1 | 2/2008 | Arms et al. |
| 2009/0322557 A1 | 12/2009 | Robb et al. |

OTHER PUBLICATIONS

Arms et al., "Energy Harvesting Wireless Sensors for Helicopter Damage Tracking", AHS 62, Phoenix, AZ, May 11, 2006.

Maley et al., "US Navy Roadmap to Structural Health and Usage Monitoring", AHS 63, Virginia Beach, VA May 1-3, 2007.

Silijander, A., "A Review of Aeronautical Fatigue Investigations in Finland During the Period Feb. 2001 to Mar. 2003", Finnish Air Force Headquarters, Aircraft & Weapons Systems Division, Research Report BTUO33-031123, Presented at 28th Conference of the International Committee on Aeronautical Fatigue, Lucerne, Switzerland, May 2003.

Phares, Brent M., Rolander, Dennis D., Graybeal, Benjamin A., and Washer, Glenn A., US-DOT, Federal Highway Administration, http://www.tfhrc.gov/pubrds/marapr01/bridge.htm, Mar./Apr. 2001.

Catbas, F. Necati; Susoy, Melih; and Kapucu, Naim "Structural Health Monitoring of Bridges for Improving Transportation Security," Journal of Homeland Security and Emergency Management: vol. 3: Iss. 4, Article 13., http://www.bepress.com/jhsem/vol3/iss4/13, 2006.

Kirking, B., Krevolin, J., Townsend, C.P., Colwell, C.W., D'Lima, D.D., "A Multiaxial Force-Sensing Implantable Tibial Prosthesis", J. Biomechanics, vol. 39, pp. 1744-1751, 2006.

Arms et al., Tracking Pitch Link Dynamic Loads with Energy Harvesting Wireless Sensors, AHS 63, Virginia Beach, VA May 2007.

Arms, S.W., Townsend, C.P., Churchill, D.L., Hamel, M.J., "Optimization of Piezoelectric Energy Harvesting Systems for Sensing Applications", presented at Univ. of Texas at Arlington, (UTA) Annual Piezoelectric Energy Harvesting Workshop, Jan. 30, 2007.

* cited by examiner

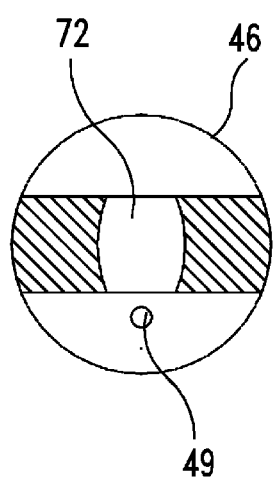
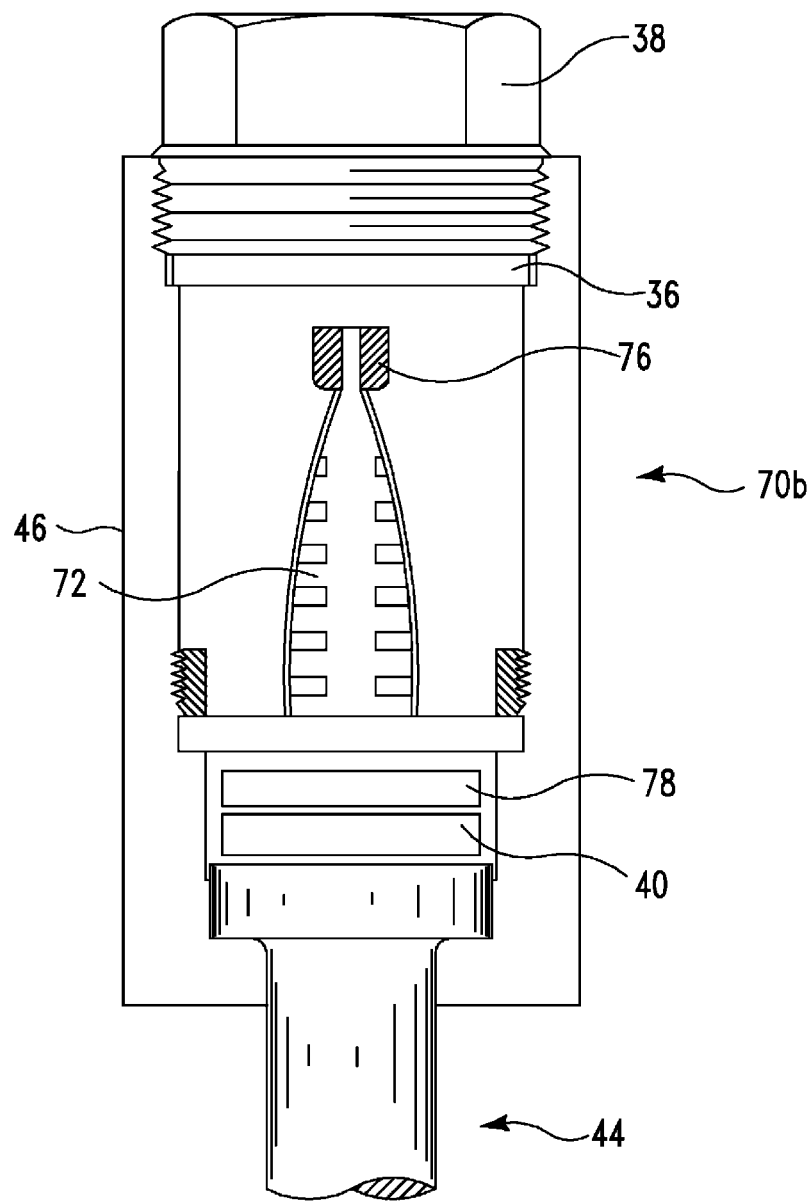
FIG. 6b
FIG. 6a

Stress at Gage Location

| Applied Load | Location 1 | | | Location 2 | | | Location 3 | | | Location 4 | | |
|---|---|---|---|---|---|---|---|---|---|---|---|---|
| | $\sigma_{zz}$ | $\sigma_{zx}$ | $\sigma_{zy}$ | $\sigma_{zz}$ | $\sigma_{zx}$ | $\sigma_{zy}$ | $\sigma_{zz}$ | $\sigma_{zx}$ | $\sigma_{zy}$ | $\sigma_{zz}$ | $\sigma_{zx}$ | $\sigma_{zy}$ |
| $V_x$ | 0 | 0 | 0 | 0 | $\dfrac{2V_x}{A}$ | 0 | 0 | 0 | 0 | 0 | $\dfrac{2V_x}{A}$ | 0 |
| $V_y$ | 0 | 0 | $\dfrac{2V_y}{A}$ | 0 | 0 | 0 | 0 | 0 | $\dfrac{2V_y}{A}$ | 0 | 0 | 0 |
| $M_x$ | 0 | 0 | 0 | $-\dfrac{M_x r}{I}$ | 0 | 0 | 0 | 0 | 0 | $\dfrac{M_x r}{I}$ | 0 | 0 |
| $M_y$ | $\dfrac{M_y r}{I}$ | 0 | 0 | 0 | 0 | 0 | $\dfrac{M_y r}{I}$ | 0 | 0 | 0 | 0 | 0 |
| $M_z$ | 0 | 0 | $\dfrac{M_z}{rA}$ | 0 | $\dfrac{M_z}{rA}$ | 0 | 0 | 0 | $-\dfrac{M_z}{rA}$ | 0 | $-\dfrac{M_z}{rA}$ | 0 |
| $P_z$ | $\dfrac{P_z}{A}$ | 0 | 0 | $\dfrac{P_z}{A}$ | 0 | 0 | $\dfrac{P_z}{A}$ | 0 | 0 | $\dfrac{P_z}{A}$ | 0 | 0 |

FIG. 11

| Gage ID | Location | Gage Orientation | Strain on Gage, $\varepsilon$, due to Applied Loads |
|---|---|---|---|
| G1 | 1 | +45 | $\frac{1}{E}\left(\frac{1}{2}\frac{P_z}{A} - \frac{1}{2}\frac{M_y r}{I} + \frac{2V_y}{A} + \frac{M_z}{rA}\right)$ |
| G2 | 1 | -45 | $\frac{1}{E}\left(\frac{1}{2}\frac{P_z}{A} - \frac{1}{2}\frac{M_y r}{I} - \frac{2V_y}{A} - \frac{M_z}{rA}\right)$ |
| G3 | 2 | +45 | $\frac{1}{E}\left(\frac{1}{2}\frac{P_z}{A} - \frac{1}{2}\frac{M_x r}{I} + \frac{2V_x}{A} + \frac{M_z}{rA}\right)$ |
| G4 | 2 | -45 | $\frac{1}{E}\left(\frac{1}{2}\frac{P_z}{A} - \frac{1}{2}\frac{M_x r}{I} - \frac{2V_x}{A} - \frac{M_z}{rA}\right)$ |
| G5 | 3 | +45 | $\frac{1}{E}\left(\frac{1}{2}\frac{P_z}{A} + \frac{1}{2}\frac{M_y r}{I} + \frac{2V_y}{A} + \frac{M_z}{rA}\right)$ |
| G6 | 3 | -45 | $\frac{1}{E}\left(\frac{1}{2}\frac{P_z}{A} + \frac{1}{2}\frac{M_y r}{I} - \frac{2V_y}{A} - \frac{M_z}{rA}\right)$ |
| G7 | 4 | +45 | $\frac{1}{E}\left(\frac{1}{2}\frac{P_z}{A} + \frac{1}{2}\frac{M_x r}{I} + \frac{2V_x}{A} - \frac{M_z}{rA}\right)$ |
| G8 | 4 | -45 | $\frac{1}{E}\left(\frac{1}{2}\frac{P_z}{A} + \frac{1}{2}\frac{M_x r}{I} - \frac{2V_x}{A} + \frac{M_z}{rA}\right)$ |

FIG. 12

INDEPENDENTLY CALIBRATED WIRELESS STRUCTURAL LOAD SENSOR

RELATED PATENT APPLICATIONS AND PRIORITY

This application claims priority of Provisional Patent Application 61/062,140, filed Jan. 24, 2008, incorporated herein by reference.

This application is also related to the following patents and patent applications, all of which are incorporated herein by reference:
1. U.S. Pat. No. 3,695,096 Strain detecting load cell
2. U.S. Pat. No. 4,283,941 Double shear beam strain gauge load cell
3. U.S. Pat. No. 4,364,280 Double shear beam strain gauge load cell
4. U.S. Pat. No. 7,188,535 Load cell having strain gauges of arbitrary location
5. U.S. Pat. No. 6,629,446 Single vector calibration system for multi-axis load cells and method for calibrating a multi-axis load cell
6. U.S. Pat. No. 7,170,201 Energy harvesting for wireless sensor operation and data transmission
7. U.S. Pat. No. 7,081,693 Energy harvesting for wireless sensor operation and data transmission
8. U.S. Pat. No. 7,143,004 Solid state orientation sensor with 360 degree measurement capability
9. U.S. Pat. No. 6,871,413 Miniaturized inclinometer for angle measurement with accurate measurement indicator
10. U.S. Pat. No. 6,529,127 System for remote powering and communication with a network of addressable, multichannel sensing modules
11. U.S. Pat. No. 5,887,351 Inclined plate 360 degree absolute angle sensor
12. 20050146220 Energy harvesting for wireless sensor operation and data transmission
13. 20050140212 Energy harvesting for wireless sensor operation and data transmission
14. 20050116545 Energy harvesting for wireless sensor operation and data transmission
15. 20050116544 Energy harvesting for wireless sensor operation and data transmission
16. 20050105231 Energy harvesting for wireless sensor operation and data transmission
17. 20040078662 Energy harvesting for wireless sensor operation and data transmission
18. 20060103534 Identifying substantially related objects in a wireless sensor network
19. Ser. No. 09/731,066 Data Collection and Storage Device
20. Ser. No. 09/768,858 & 10/215,752 (divisional) Micropower Differential Sensor Measurement
21. Ser. No. 10/769,642 Shaft mounted energy harvesting for wireless sensor operation and data transmission
22. Ser. No. 11/084,541 Wireless Sensor System
23. Ser. No. 11/091,244 Strain Gauge with Moisture Barrier and Self-Testing Circuit
24. Ser. No. 11/260,837 Identifying substantially related objects in a wireless sensor network
25. Ser. No. 11/368,731 and 60/659,338 Miniature Acoustic Stimulating and Sensing System,
26. Ser. No. 11/604,117, Slotted Beam Piezoelectric Composite Structure,
27. Ser. No. 11/585,059, Structural damage detection and analysis system
28. Ser. No. 11/518,777, Energy Harvesting Wireless Structural Health Monitoring System
29. 60/898,160 Wideband Energy Harvester,
30. 60/497,171 A Capacitive Discharge Energy Harvesting Converter

FIELD

This patent application generally relates to structural load sensing. More particularly it relates to structures with a removable load bearing element that include a load sensing device. Even more particularly it relates to structures with shear pins that include load sensing devices.

BACKGROUND

Load monitoring of large and expensive structural frames, such as aircraft and roadway bridges has been used to measure loads that lead to structural fatigue. Such measurements have identified structures in need of maintenance. They have also provided a way to lower overall maintenance costs, increase life span, and delay replacement costs.

In one example, the US Navy used conventional bonded foil type strain gauges to track operational structural loads on its fleet of fixed wing aircraft, including the F-18. The hard-wired structural monitoring system provided load information that greatly increased the operational life of the Navy's F-18 fleet. On average, these aircraft now operate for over 13,000 flight hours, more than twice the manufacturer's design life estimate of 6000 hours. If these flight hours had been replaced with new aircraft, as originally planned, the cost could be estimated at about $11B. However, this monitoring scheme has been costly and difficult to maintain for application to other fleets of aircraft.

Helicopter component loads, for example, have traditionally been monitored on only one or two strain gauge instrumented flight test aircraft, using slip rings to provide data on rotating components. These techniques were too costly and difficult to maintain for use on an entire fleet of helicopters. Instead of basing fatigue life of critical components, such as the pitch links, pitch horns, swash plate, yoke and rotor, on measured loads on those components on each helicopter, fatigue life was conservatively estimated based on the aircraft's flight hours, as described in an article, "The Art of Helicopter Usage Spectrum Dev." by S. Moon & C. Simmerman, Am. Helicopter Soc. (AHS) 61st Annual Forum, Grapevine, TX June 1-3, 2005.

Improvements, such as implementing energy harvesting, combined with advanced, micro-power wireless sensing electronics, enabled the realization of direct tracking of the operational loads on these rotating structures, resulting in improved condition based maintenance and enhance safety based on data obtained in instrumented test aircraft, as described in the articles, "Energy Harvesting Wireless Sensors for Helicopter Damage Tracking" by Arms et al., AHS 62, Phoenix, AZ, May 11th, 2006 and "US Navy Roadmap to Structural Health and Usage Monitoring" by Maley at al., AHS 63, Virginia Beach, VA, May 1-3, 2007.

In a report published by the Finnish Air Force, "A Review of Aeronautical Fatigue Investigations in Finland During the Period Feb 2001 to March 2003" by Siljander, A., Finnish Air Force Headquarters, Aircraft & Weapons Systems Division, Research Report BTUO33-031123, Presented at 28th Conference of the International Committee on Aeronautical Fatigue, Lucerne, Switzerland, May 2003, the authors stated that a reliable strain gauge fatigue damage detection system requires the following items:

an understanding of the monitored structures' mechanical behavior due to operational and environmental loads;

proper placement of sensors in the vicinity of structural fatigue "hot spots";

proper tuning of the data acquisition parameters, such as sampling resolution and sample rates;

tailored algorithms to analyze the sensor data to come up with reliable indications of structural deterioration, which would trigger maintenance actions.

In order to obtain useful loads data from an airframe structure instrumented with strain gauges, the strain gauges are calibrated to relate the strain gauge data to the loads experienced by the aircraft. This can be done on one or two flight test vehicles by applying static loads and moments in a full-scale test rig and monitoring the responses from various strain gauges. For a fleet of aircraft, however, this approach has been too expensive and time consuming.

Flight calibration has been a practical alternate approach, in which each aircraft in the fleet is flown in specific, proscribed maneuvers to create a known loading condition, and this in turn is used to calibrate the strain gauge's output. However, these calibration methods introduce variability based on the pilot's technique as well as variation due to strain gauge installation and manufacturing variations. Furthermore, portions of the airframe such as the vertical tail and canopy sill are not easily loaded through proscribed flight maneuvers.

Similar monitoring has been needed for road and railway bridges across the United States, as described in US-DOT, Federal Highway Administration, http://www.tfhrc.gov/pubrds/marapr01/bridge.htm, by Phares, Brent M., Rolander, Dennis D., Graybeal, Benjamin A., and Washer, Glenn A., March/April 2001 and in "Structural Health Monitoring of Bridges for Improving Transportation Security," by Catbas, F. Necati; Susoy, Melih; and Kapucu, Naim Journal of Homeland Security and Emergency Management: Vol. 3: Iss. 4, Article 13 (2006), http://www.bepress.com/jhsem/vol3/iss4/13.

Recent catastrophic failures of bridges have highlighted the need for accurate loading information that would trigger maintenance activities to avoid the tremendous loss of life and property that accompany these events.

Construction of an instrumented shear pin for a load cell is described in U.S. Pat. Nos. 3,695,096 ("the '096 patent") and 4,283,941 to Kutsay, both incorporated herein by reference. The '096 patent provides a pin or bolt with an axial bore that contains electrical strain gauges attached to its circumferential inner wall and having leads connected to exterior instrumentation, such as Wheatstone bridge instrumentation. The arrangement and orientation of the gages permit evaluation of the applied load both as to magnitude and direction.

A process for inserting the strain gauges into the axial bore in a bolt is described in U.S. Pat. No. 2,873,341 ("the '341 patent") to Kutsay, incorporated herein by reference. In the '341 process, a core with the strain gauge mounted thereon is dipped or coated with epoxy and pressed into the bore. In one embodiment described in the '341 patent, a metallic core is cooled in dry ice or in any other manner and then inserted in the bore and allowed to expand therein so that the strain gauge is squeezed against the inner wall of the bore to make a shrink fit.

International patent publication WO 2006/067442 to El-Bakry, et al, ("the El-Bakrey patent application") incorporated herein by reference, describes a pin bearing arrangement for use on an aircraft landing gear that includes a pin, and means including strain gauges for measuring shear loads and accelerometers for measuring loads sustained by the pin. Inside the pin there is provided a processing unit, a memory store, and a battery-based power source. During normal operation of the aircraft fatigue loads can be monitored, the processing unit receiving input signals from the means for measuring loads and storing load data in the memory. The stored data is periodically extracted from the memory during maintenance of the aircraft. Thus, the pin bearing arrangement is able to perform the function of a self-contained load data logging device for logging data concerning loads sustained by the pin. And there is no need for any part of the pin bearing arrangement (in particular, the means for measuring loads) to be connected to any part of the aircraft's standard computer system.

A better system for monitoring structures and reducing failures has been needed that does not rely on expensive monitoring and calibration schemes. Several embodiments of such a system are provided in this patent application.

SUMMARY

One aspect of the present patent application is a device that includes a removable load element. The removable load element includes a pin portion and a housing portion. The pin portion extends from the housing portion. The pin portion includes a sensor. The housing portion includes an electronic circuit connected to the sensor.

Another aspect is a structure that includes a plurality of removable load elements. Each of the removable load elements includes a sensor, a transceiver, and a clock. The clock is connected to the transceiver for receiving a timing signal for synchronizing.

Another aspect is a device that includes a removable load element. The removable load element includes strain sensors arranged to cancel bending and torsion loads and to amplify shear loads.

BRIEF DESCRIPTION OF THE DRAWINGS

The foregoing will be apparent from the following detailed description, as illustrated in the accompanying drawings, in which:

FIG. 4b is a side x-ray view of the embodiment of an instrumented shear pin of FIG. 4a;

FIG. 4c is an exploded view of the embodiment of an instrumented shear pin of FIG. 4a;

FIG. 4d' is a top view of the interior of the housing of the instrumented shear pin of FIG. 4a;

FIG. 4e is a three dimensional view of a clevis with the instrumented shear pin of FIG. 4a;

FIG. 5b is a three dimensional cross sectional view of the instrumented shear pin with the energy harvesting power supply of FIG. 5a;

FIG. 6 is a cross sectional view of another embodiment of an instrumented shear pin that has an energy harvesting power supply;

FIG. 11 is a table showing stress at strain gauge locations as a result of an applied load;

FIG. 12 is a table showing surface strain detected by each strain gauge as a result of applied loads;

DETAILED DESCRIPTION

As described herein above, direct instrumentation of the frame of a structure with bonded foil strain gauges, or other hard wired sensors, has presented the problem of calibrating the entire structure in order to acquire meaningful long term in-service data. Removable load bearing elements, such as shear pins and bolts, are used extensively on fixed and rotary wing aircraft, bridges and civil structures, large machinery, ships and naval vessels. These removable load bearing elements can be instrumented with strain gauges, as described in the Kutsay patents, and with electronic components, as described in the El Bakry patent application. They may be factory calibrated independent of the structure to which they are mounted to perform load monitoring for structural health monitoring.

Figure 1:
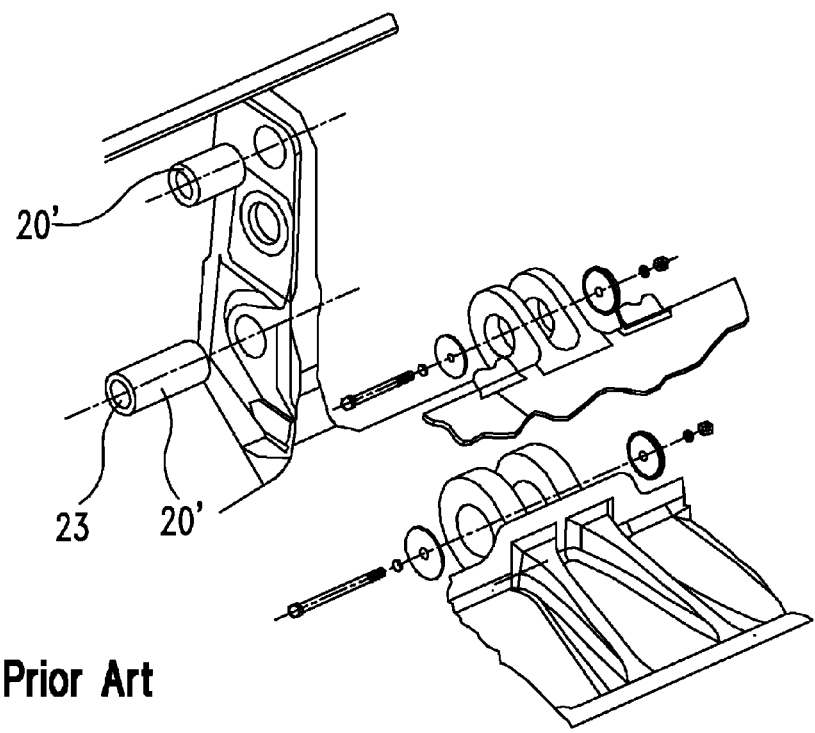
FIG. 1 is a three dimensional exploded view showing two of the standard F-18 shear pins for holding a wing to a fuselage.
Figure 2A:
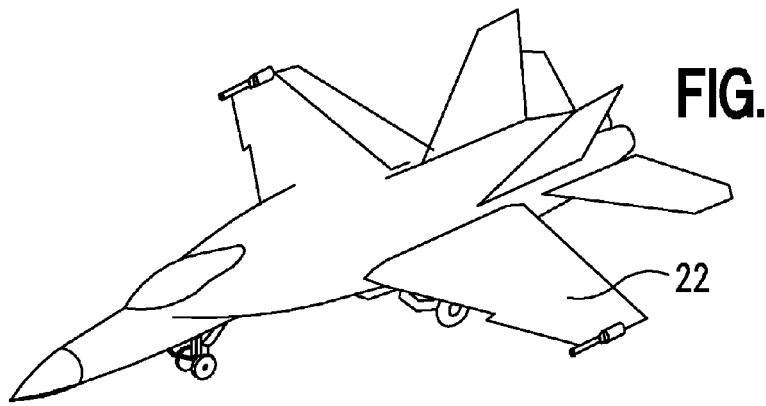
FIG. 2a is a three dimensional view of an F-18.
Figure 2B:
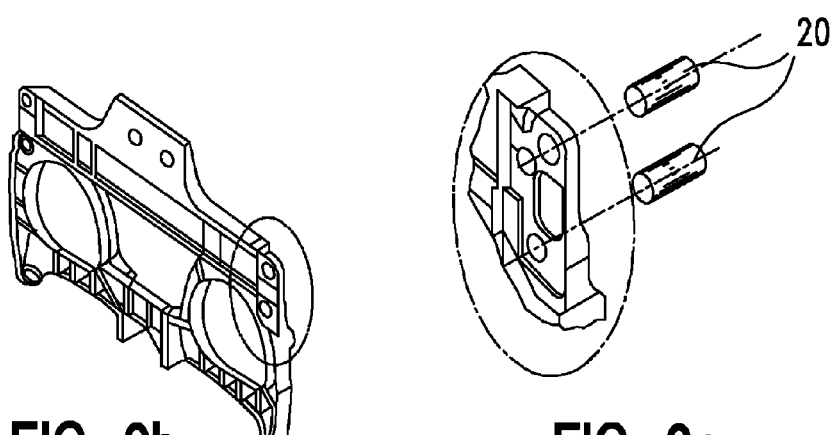
FIG. 2b-2c is a three dimensional exploded view showing instrumented shear pins replacing the standard shear pins for holding the wing to the fuselage.
Figure 2C:
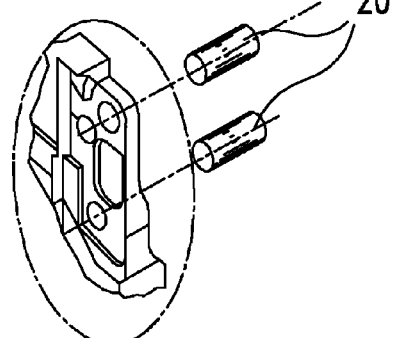
Figure 3A:
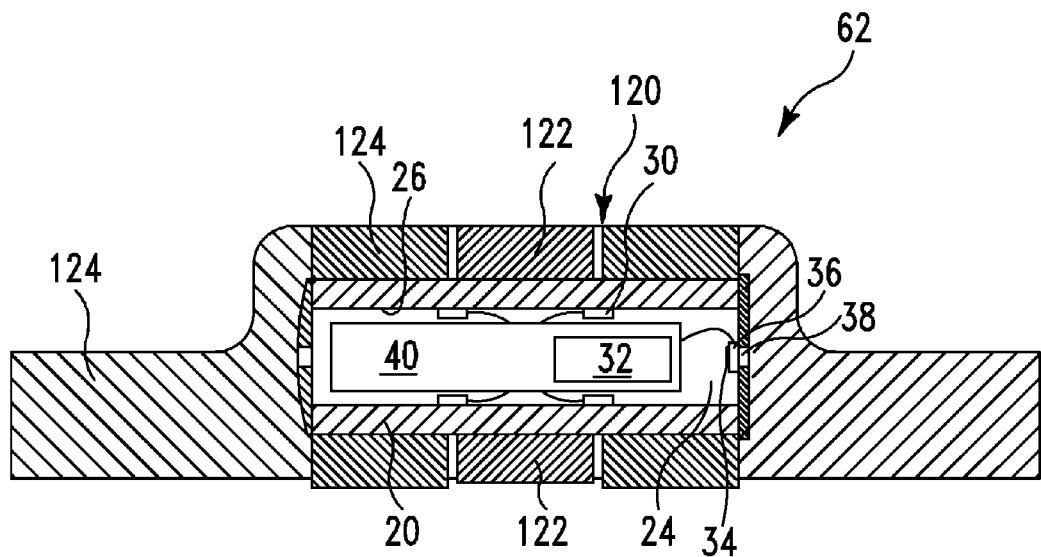
FIG. 3a is a cross sectional view of a shear joint with an instrumented shear pin.
Figure 3B:
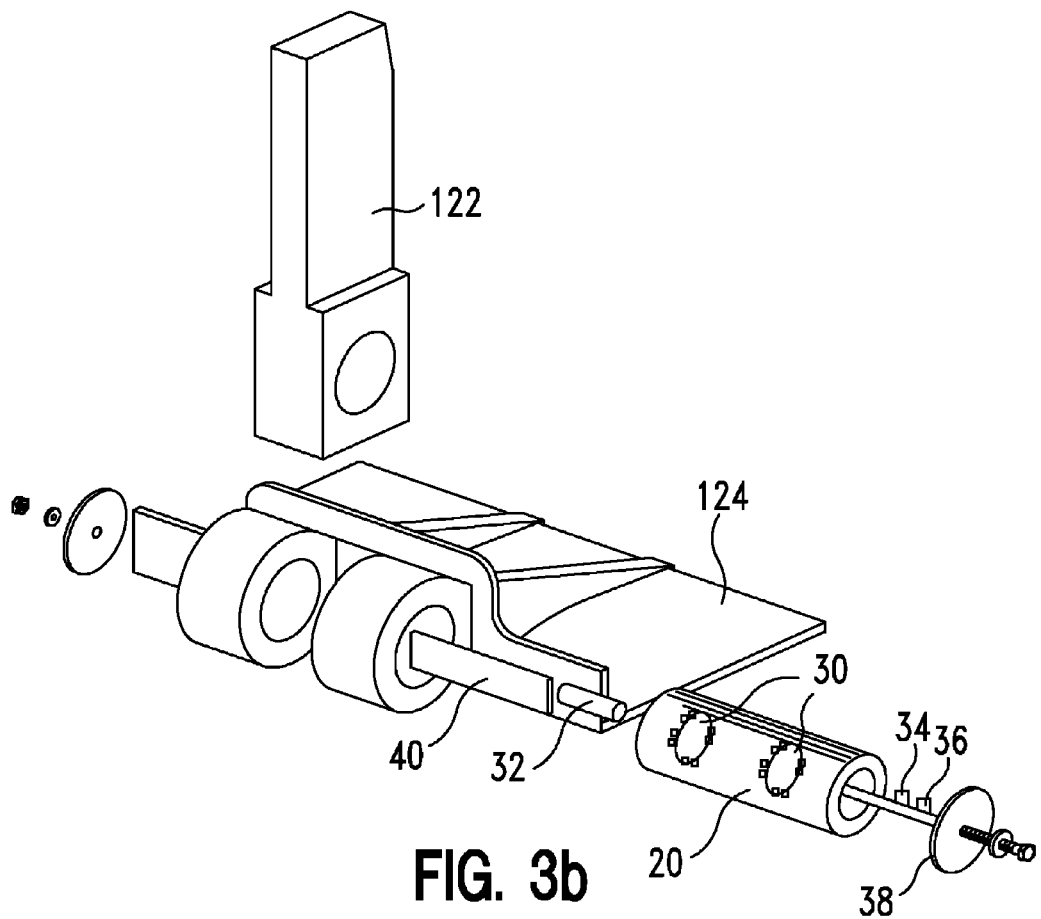
FIG. 3b is a three dimensional view of a shear joint with an instrumented shear pin.
Figure 3C:
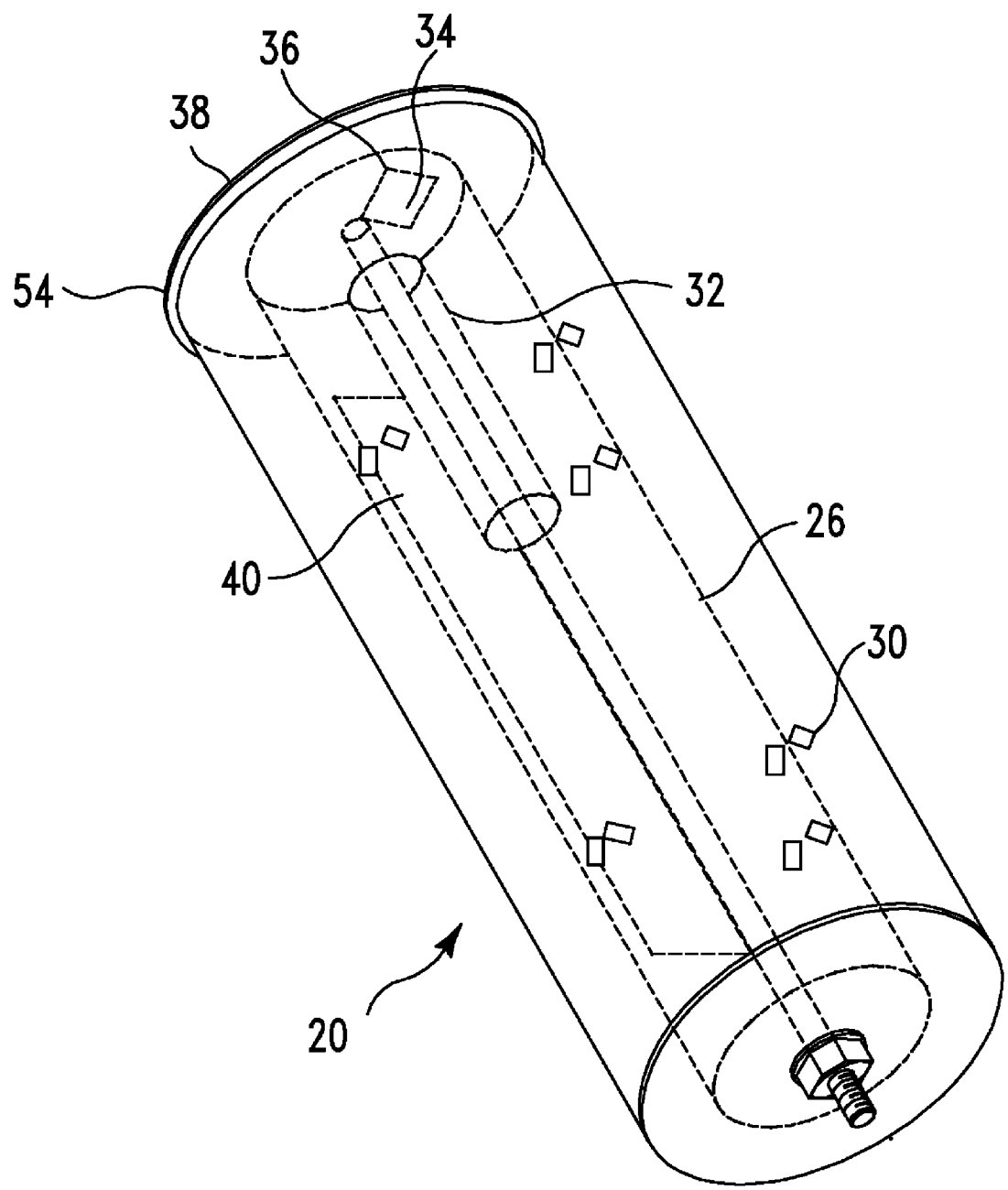
FIG. 3c is a three dimensional view of one embodiment of an instrumented shear pin.

In one embodiment, existing standard shear pins 20' in shear joints on existing structures are replaced with instrumented shear pins 20 to provide structural load information on the existing structures. For example, standard un-instrumented F-18 shear pins 20' of FIG. 1 is replaced with instrumented F-18 shear pins 20 to secure the aircraft's wing 22 to its fuselage 23, as shown in FIGS. 2a-2c and FIGS. 3a-3c. Replacement shear pins 20 may have dimensions identical to standard F-18 shear pins, approximately 2.5 inches in outside diameter, and including center hole 24 extending along their length that is approximately 1.0 inches in diameter. The present applicants recognized that inner wall 26 of center hole 24 of standard F-18 shear pin 20' provides a suitable location for load measuring instrumentation, such as strain gauges 30, that may be placed and potted within instrumented shear pin 20, as shown in FIGS. 3a-3c. Strain gauges 30 may be mounted in locations in center hole 24 where the shear loads are applied. The large diameter of center hole 24 also permits inclusion of a power supply, such as battery 32, antenna chip 34, antenna board 36, cap 38, and circuit board 40 that includes electronic support circuits. Antenna chip 34 may be a fractal antenna chip available from Fractus, S.A., Barcelona, Spain. Wires 41 connect strain gauges 30 with circuit board 40.

In another embodiment, instrumented shear pin bolt 44 includes one or more internal strain gauges 30 bonded to inner wall 26 of center hole 24, as shown in FIGS. 4a-4e. Strain gauges 30 were mounted in locations in center hole 24 where the shear loads are applied.

Figure 4A:
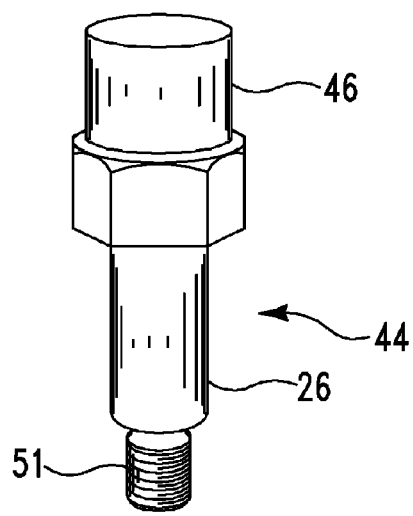
FIG. 4a is a side view of another embodiment of an instrumented shear pin.
Figure 4B:
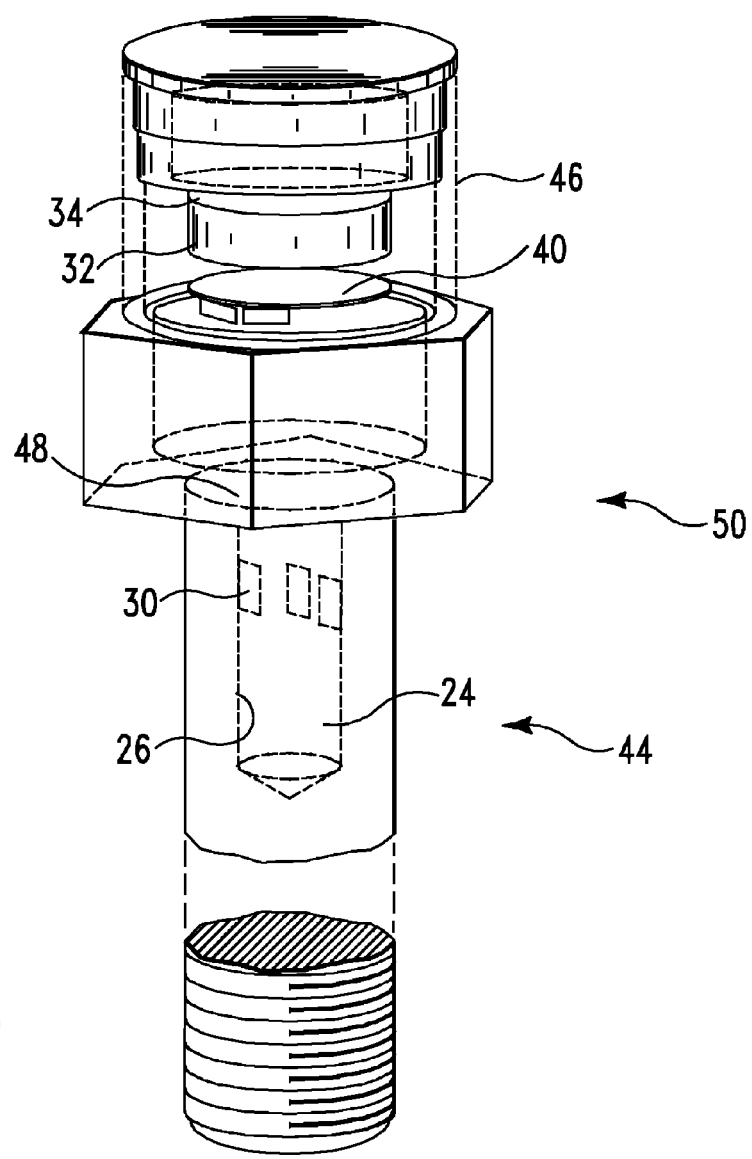
Figure 4C:
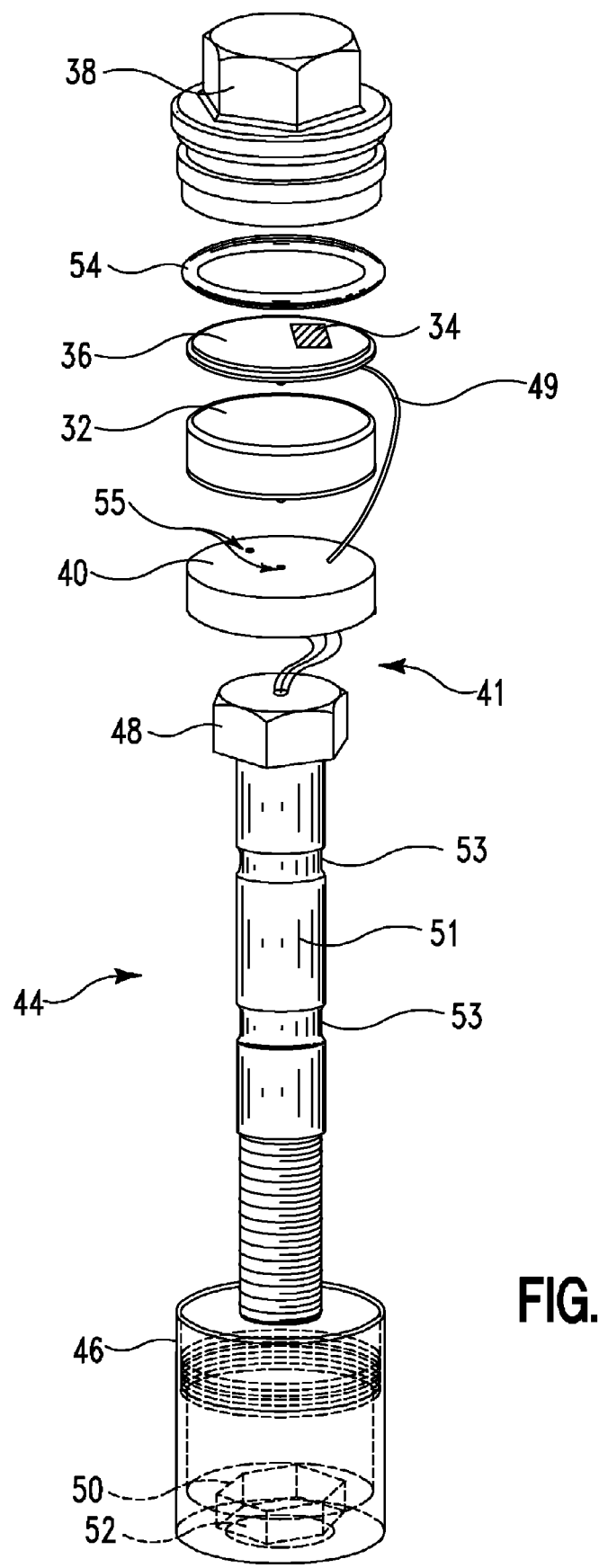
Figure 4D:
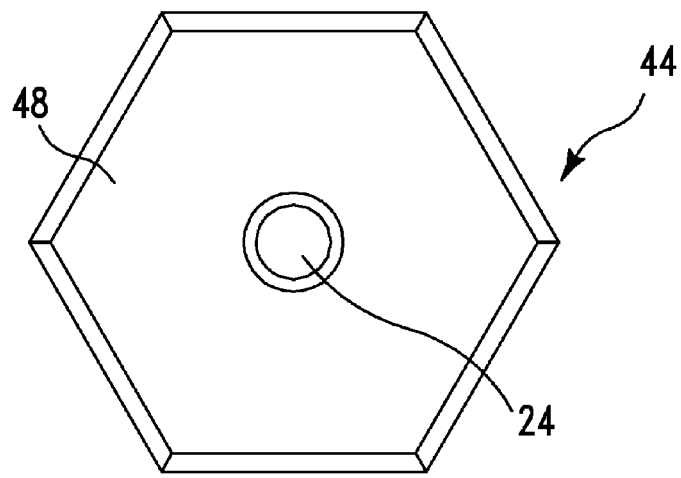
FIG. 4d is a top view of the head of the instrumented shear pin of FIG. 4a that fits in the housing of FIG. 4d'.
Figure 4D:
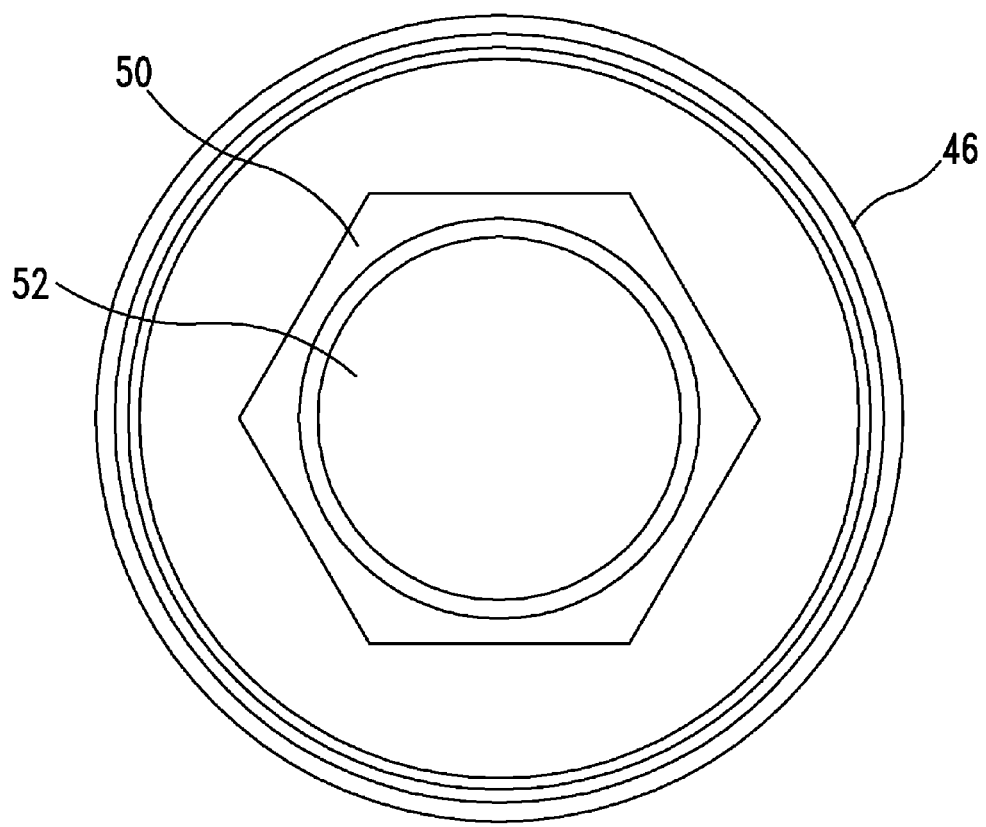
Figure 4E:
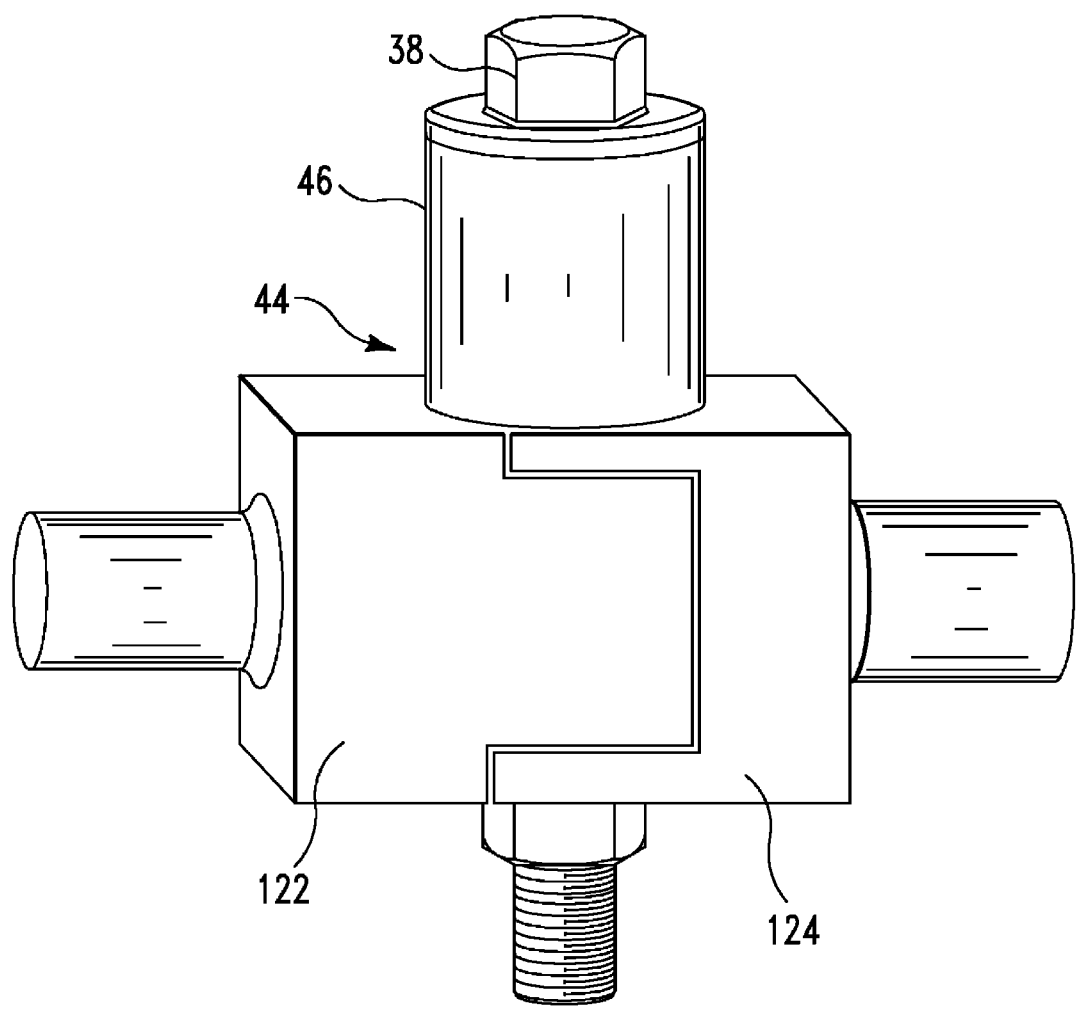

In this embodiment, battery 32, antenna chip 34, antenna board 36, cap 38, and circuit board 40 were all enclosed within environmentally sealed housing 46 connected to head 48 of removable wirelessly instrumented shear pin bolt 44. Antenna chip 34 is connected to antenna board 36 with coaxial cable 49 that extends around battery 32. Head 48 portion of shear pin bolt 44 was seated in head holding rim 50 while elongate pin portion 51 of shear pin bolt 44 was fitted through hole 52 in housing 46. Elongate pin portion 51 can have fillets 53 located in the region of strain gauges 30, as shown in FIG. 4c. Fillets 53 enhance strain sensor sensitivity though they do weaken the structure slightly. Housing 46 includes flats to facilitate installation, as shown in FIG. 4a-4d. Head holding rim 50 prevented rotation of head 48 within housing 46. Cap 38 screwed onto housing 46 and was sealed with o-ring seal 54. Cap 38 includes flats to facilitate access to the battery, as shown in FIGS. 4c-4e and FIGS. 5a-5b. O-ring seal 54 provided a sealed enclosure for wirelessly instrumented shear pin 20 and shear pin bolt 44 that provided environmental protection for the strain gauges, power supply, and electronic circuits. Battery 32 had pins that inserted into spring loaded receptacles 55 in circuit board 40. A user has access to change battery 32 by unscrewing cap 38, temporarily displacing antenna board 36, and unplugging and replacing battery 32.

Cap 38 was fabricated of Delrin, a polymeric material, that permits wireless transmission, such as radio or optical, and that is stable as temperature changes. Materials such as PEEK (polyetheretherketone) or polycarbonate may also be used. With antenna chip 34 located on antenna board 36 adjacent cap 38, interference with radio communication is avoided. Radio communication can use IEEE 802.15.4 or IEEE 802.15.4a, a low power ultra wide band radio communication standard that allows location tracking to within 10 cm over a range of 70 m. This location tracking can be used to locate each wirelessly instrumented shear pin 44 and to ensure that each wirelessly instrumented shear pin 44 has been installed in the proper location.

Alternatively, housing 46 and shear pin bolt 44 can be formed of one integral piece of material into which strain gauges 30 and electronic circuits are mounted.

The present applicants found that electrical discharge machining (EDM) could be used to create a very small diameter center hole 24 with minimal reduction of material strength, while retaining other desired material characteristics. Thus, wirelessly instrumented shear pin bolt 44 can be fabricated of a very hard material, such as high grade stainless steel, inconel, titanium, and liquid metal, an amorphous metal alloy. If the application is one for which a hard electrically conductive material is needed, the EDM technique is advantageous because it can spark out hard conductive materials. Center hole 24 can be formed with a drill or end mill in softer materials, such a composite material or a polymer.

In one process used by applicants to mount strain gauges 30, applicants formed a core out of an extensible material, such as silicone rubber. They mounted the strain gauges 30 on the outside surface of the core, applied epoxy to the top surface of strain gauges 30, and inserted the core into center hole 24 of shear pin 20 or shear pin bolt 44. They then pressurized the core with air to push the strain gauges mounted thereon against inner wall 26 of center hole 24. Once the epoxy cured they removed that source of pressure, leaving strain gauges 30 adhesively connected to inner wall 26 of center hole 24.

In another embodiment, a core fabricated of a solid material can be used. Leaving a solid core material in center hole 24 helps the bolt recover some of the strength lost due to the center hole. Materials like carbon reinforced PEEK or other composite material could be used for a core material to further increase strength and could impart greater toughness to the bolt as compared to a bolt with a void center hole, adding strength within center hold 24 and providing some added resistance to crack propagation.

After center hole 24 is formed, residual compressive stress can be provided to all portions of inner wall 26, expanding diameter of center hole 24 without changing outside diameter of shear pin 20 or shear pin bolt 44. Residual compressive stress can be provided by pulling a hard material that has an outside diameter that is slightly larger than the diameter of center hole 24 through center hole 24. Residual compressive stress can also be provided by using thermal expansion of the core coupled with contraction of sheer pin 20 or shear pin bolt 44.

Applicants calibrated wirelessly instrumented shear pin bolt 44 and found that the calibration was satisfactorily accomplished independently of the structure on which wirelessly instrumented shear pin bolt 44 was to be mounted. Calibration was performed in a laboratory environment using static loads against an accurate load cell reference. The present applicants recognized that their calibration could include coefficients to compensate the amplified output of the strain gauge bridge system for changes in temperature. They burned the calibration coefficients, including the temperature compensation coefficients, into a non-volatile memory associated with the microprocessor.

The number of gauges used in center hole 24 and their arrangement can be optimized for a specific measurement application. For example, if the load direction is known and the shear pin is keyed to prevent rotation of the pin, and the loading experienced by the pin is primarily shear, so bending strains can be neglected, then one pair of strain gages arranged in a Wheatstone bridge in a differential fashion so they amplify shear and cancel temperature effects within center hole 24 is adequate to provide a temperature compensated load measurement. The output of each Wheatstone bridge can be doubled by using another pair of gauges at the second area of stress concentration.

If the load direction is unknown, such that it can have x and y components, a second pair of strain gauges is used at each area of stress concentration to compute a resultant force magnitude and direction based on data from two orthogonal Wheatstone bridges, such that one Wheatstone bridge measures shear loads in the x direction and the other measures shear loads in the y direction.

In an application in which keying of the bolt is not possible, or in which it is preferable to allow instrumented shear pin bolt 44 to rotate over time, applicants recognized that an orientation sensor that includes two accelerometers 64 included within housing 44 allows measurement of the orientation of bolt 44 with respect to gravity and to determine forces along x and y directions from x an y strain gauges. If the structure is a fixed civil structure, such as a bridge, then the orientation with respect to gravity is adequate. If the structure is an airplane whose orientation is unknown, then the orientation sensor within shear bolt 44 gives useful information when the orientation of the aircraft itself is known, such as when it is on the ground. Applicants can include the inclinometer in wireless instrumented shear pin bolt 44, and use data from the inclinometer to correct for changes in orientation of wireless instrumented shear pin 20, shear pin bolt 44, allowing for compensation for rotation of wireless instrumented shear pin 20 or shear pin bolt 44 around its own axis within a horizontal shear joint.

For example, for the F-18 fighter aircraft, axial rotation of the structural shear pins that secure the aircraft's wings to the fuselage may occur very gradually, such as 1 degree of rotation relative to gravity over a period of one week. Therefore, a periodic check of orientation when the vehicle is not flying is an appropriate solution. One way to accomplish this measurement is to interrogate accelerometers 64 which may be fabricated from tiny micro-electromechanical system (MEMS) dual axis (X & Y) accelerometers, such as part number ADXL203, available from Analog Devices, Norwood, Mass., which features both a static and a dynamic response and has range of +/−1.7 g's. Accelerometers 64 are located on circuit board 32, and circuit board 32 is oriented vertically when the aircraft is on the ground. Such accelerometers are used to determine the direction of housing 46 with respect to the gravity vector, as described in the U.S. Pat. Nos. 6,871,413, 5,887,351, and 7,143,004 patents, incorporated herein by reference. When the aircraft is not flying, orientation of shear joint 62 is generally horizontal relative to gravity and no inertial forces are present, so this is a suitable opportunity to interrogate accelerometers 64 within instrumented shear pin 20, shear pin bolt 44 for inclination angle. If orientation information is desired during flight, a low pass filtering scheme can be implemented as an algorithm running on microprocessor 90 on circuit board 32 to determine orientation of instrumented shear pin 20, shear pin bolt 44 in the face of transient inertial influences. Infinite Impulse Response (IIR), Finite Impulse Response (FIR), and moving average low pass filters can be implemented on microprocessor 90 and can be used for this purpose. Software filters can be reprogrammed and optimized for a particular application. Filters can also be implemented in hardware using an appropriate capacitance on the output of the ADXL203 accelerometers, as suggested by the manufacturer in application notes. Applicants found use of inclinometer 60 to be accurate to +/−0.5 degrees. Alternatively, a mechanical key, set screw, or cross pin is used to maintain wireless instrumented shear pin 20, shear pin bolt 44 in a fixed orientation with respect to shear joint 62. A mechanical key is formed by providing mating flats, as disclosed in the '096 patent.

Energy harvesting can be accomplished using thermal gradients, ambient light, ambient strain, and/or ambient vibration. For many aircraft and bridge applications, ambient vibration is present and the removable instrumented load bearing element, such as instrumented shear pin 20 or shear pin bolt 44 can include an energy harvesting system, as described in commonly assigned U.S. Pat. No. 7,081,693, "Energy Harvesting for Wireless Sensor Operation and Data Transmission", and U.S. Patent Applications, 60/898,160, "Wideband Energy Harvester", Ser. No. 11/604,117, "Slotted Beam Piezoelectric Composite Structure," 60/497,171, "A Capacitive Discharge Energy Harvesting Converter", Ser. No. 11/518,777, "Structural Damage Detection and Analysis System," and Ser. No. 11/518,777 "Energy Harvesting Wireless Structural Health Monitoring System," all of which are incorporated herein by reference.

Figure 5A:
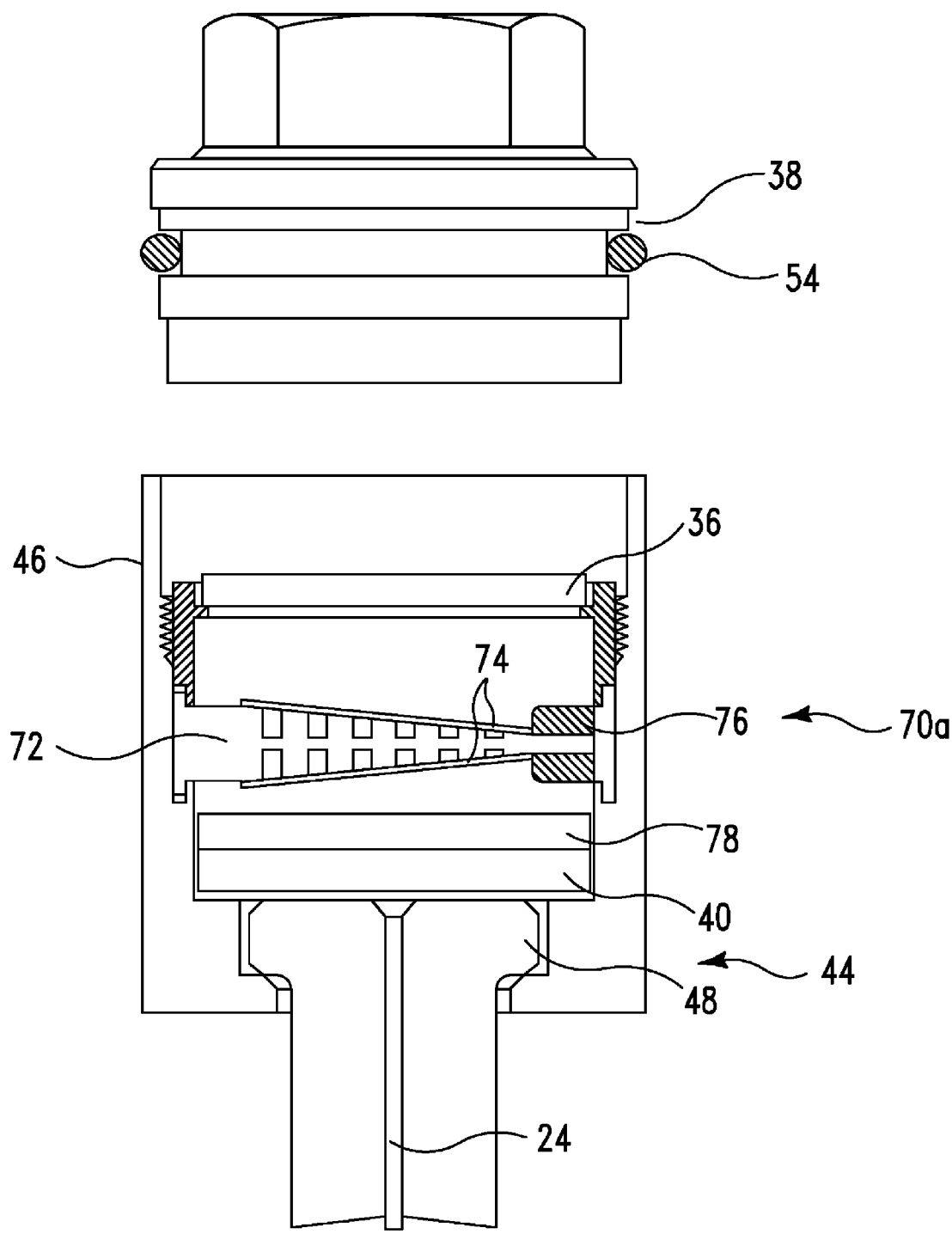
FIG. 5a is a cross sectional view of an instrumented shear pin that has an energy harvesting power supply.
Figure 5B:
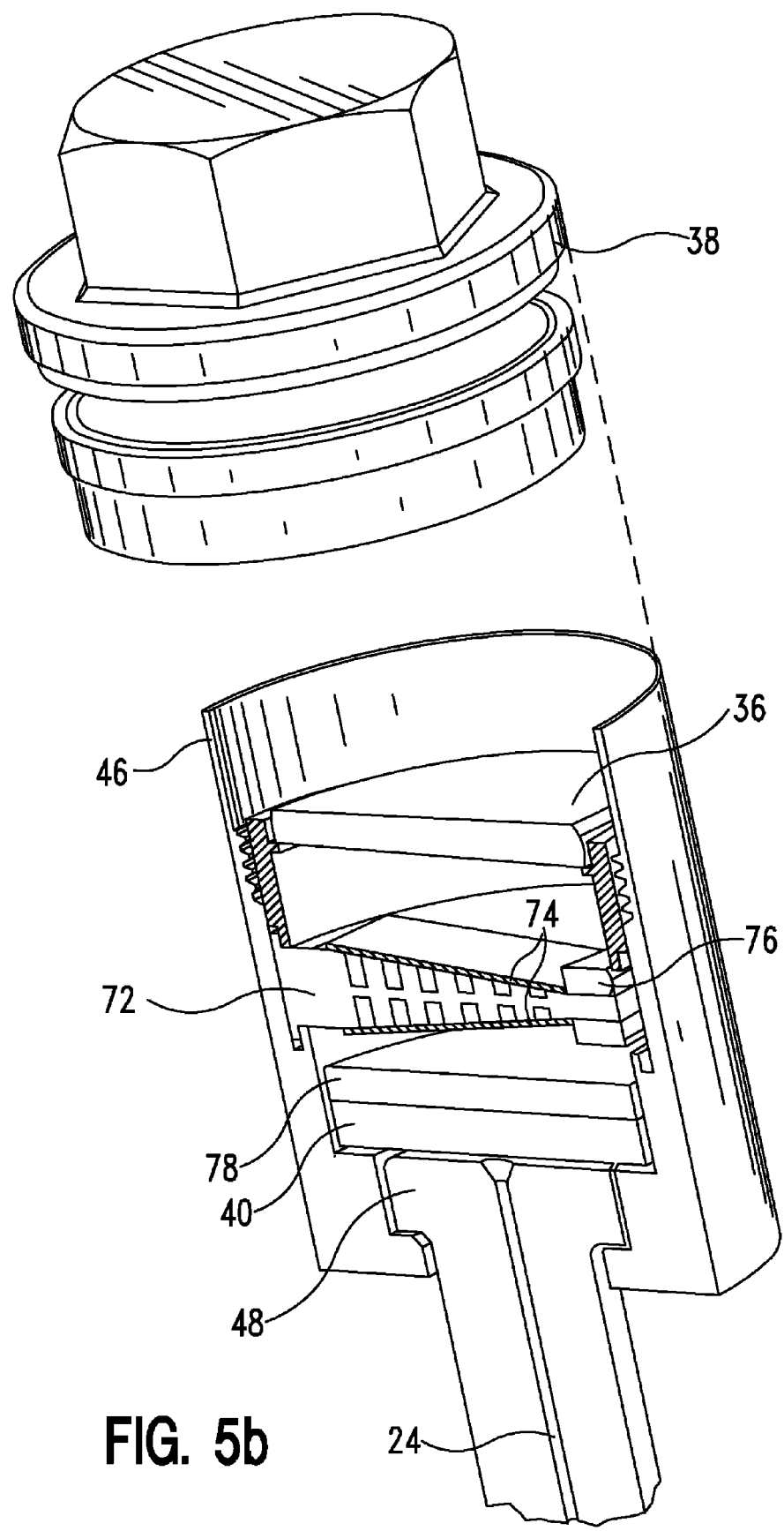

Energy harvesting is particularly suitable in applications such as a helicopter rotor blade connected to its yoke, helicopter pitch link connected to pitch horn and swash plate, connection of aircraft flaps and ailerons to wings, wings to fuselage, and in landing gear for which load is measured at a high data rate, such that a suitable primary battery would add significant weight and bulk to the assembly, and for which substantial vibration energy is available. By replacing that primary battery with small energy harvesting system 70a, 70b, a much smaller rechargeable battery can be used. Energy harvesting system 70a, 70b includes vibrating beam 72 with piezoelectric 74, mass 76, and rechargeable battery 78, as shown in FIGS. 5a, 5b and FIG. 6. Energy harvesting system 70a is oriented to capture vibration along the axis of instrumented shear pin 20 or shear pin bolt 44 while energy harvesting system 70b is oriented to capture vibration perpendicular to the axis of instrumented shear pin 20 or shear pin bolt 44. Energy harvesting system 70a, 70b fits inside housing 46 connected to head 48 of the removable load bearing element.

Electronic circuits used for collecting, storing, processing, and transmitting data from strain gauges 30 have been described in commonly assigned U.S. patent application Ser. No. 09/731,066 "Data Collection and Storage Device," Ser Nos. 09/768,858 & 10/215,752 "Micropower Differential Sensor Measurement," Ser. No. 10/769,642 "Shaft Mounted Energy Harvesting for Wireless Sensor Operation and Data Transmission," Ser. No. 11/084,541 "Wireless Sensor System," Ser. No. 11/091,244 "Strain Gauge with Moisture Barrier and Self-Testing Circuit," and Ser. No. 11/260,837 "Identifying substantially related objects in a wireless sensor network," incorporated herein by reference. Circuit board 40 has a shape to fit in housing 46 of the removable load bearing element such as wireless instrumented shear pin 20 or shear pin bolt 44. For example, circuit board 40 is round to fit in housing 46 of shear pin bolt 44, as shown in FIGS. 4a-4c. Alternatively, circuit board 40 is rectangular to fit within F-18 instrumented shear pin 20, as shown in FIGS. 3a-3c.

Figure 7:
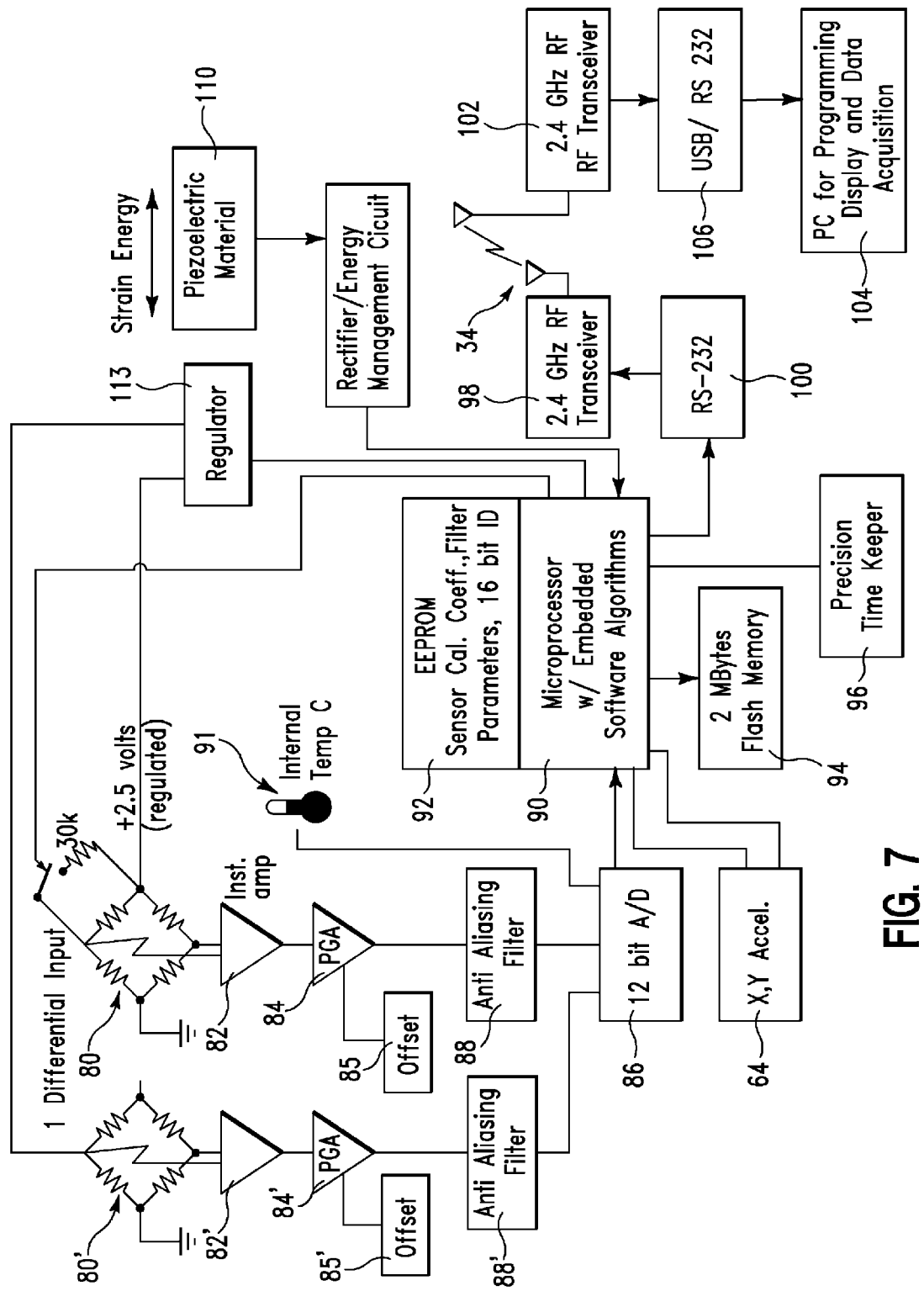
FIG. 7 is a block diagram showing an embodiment of the electronic components of an instrumented shear pin.

In one embodiment, electronic circuits include two channels, as shown in the block diagram of FIG. 7, to provide data from strain gauges oriented to measure loads orthogonal to each other. In one embodiment, Wheatstone bridge 80 includes strain gauges 30 positioned to provide a differential input signal indicating shear. Wheatstone bridge 80 provides output to chopper stabilized instrumentation amplifier 82 which provides gain, converting the differential output of bridge 80 to a single ended output of higher voltage.

Chopper stabilized instrumentation amplifier 82 provides an output signal to programmable gain amplifier 84 that provides another stage of gain that can be programmed to raise the voltage level to one that is optimum for subsequent analog to digital (a/d) conversion.

For example, output of Wheatstone bridge 80 may be a few mV. Chopper stabilized instrumentation amplifier 82 provides a gain of about ten, giving an output in the range of 30 to 50 mV. Programmable gain amplifier 84 has offset trim 85 so that when the instrumented shear pin 20 is under no load, the output of programmable gain amplifier 84 is in the midrange of a/d converter 86, and programmable gain amplifier 84 then provides gain to provide an output from −1.5 to +1.5 Volts to get full use of the resolution of a/d converter 86.

Output of programmable gain amplifier 84 goes to anti aliasing filter 88 which provides low pass filtering suitable for the sample rate of the application.

A second channel may be provided that has another copy of these components for measuring orthogonal loads.

The signal from anti aliasing filter 88 goes to 12, 16, or 24-bit analog to digital (A/D) converter 86 which provides a digital signal input to microprocessor 90 that has embedded software algorithms.

On-board temperature sensor 91 is included to facilitate temperature compensation, using algorithms and compensation coefficients embedded within microprocessor 90 during the calibration procedure. Temperature sensor 91 may be placed within center hole 24 to provide a direct measurement of the temperature of inner wall 26 of instrumented shear pin 20 or shear pin bolt 44.

EEPROM 92 is connected to microprocessor 90 for storing sensor calibration coefficients, filter parameters, and a 16 bit identification code for the particular sensor. Calibration coefficients include those for temperature compensation. Offset and sensitivity of the sensor and signal conditioning chain can be corrected with these calibration coefficients in the processor During calibration shear pin 20 or shear pin bolt 44 and associated electronics are exposed to a range of temperatures and loads so coefficients related to temperature, offset and gain can be obtained. If sensors are placed for x and y directions, then four coefficients are obtained. If the temperature compensation is non-linear then more coefficients may be used to fit a non-linear polynomial to those parameters.

An additional 2 MB of flash memory 94 is also connected to microprocessor 90 for storing shear pin loads data, time, and temperatures.

Precision timekeeper 96 is also connected to microprocessor 90 for providing a time stamp to data as data are received. Time synchronization for multiple wireless devices was described in copending patent application Ser. No. 11/518,777 ("the '777 application"), incorporated herein by reference.

With three shear pin 20 or shear pin bolt 44 sensors located at each aileron and flap, the loads data that are collected are synchronized very accurately to enable aircraft structural engineers (or an on-board algorithm) to calculate the control surface loads. An accurate time-stamping and synchronization technique was described in the 777 application.

A wireless sensor data aggregation node (WSDA) has been developed that is capable of collecting time stamped data from both wired and wireless sensor networks. Precision time keepers, embedded within each sensor node, are synchronized to the WSDA using a beaconing method to provide a periodic timing reference. Synchronization of the sensor network provides several key advantages, including enhanced scalability of wireless communications, and the ability to store all sensor data in a single time stamped parametric database. The system achieved a timing synchronization accuracy of about 5 milliseconds with a timing beacon sent every 2 hours. The accuracy improved when the thermal environment was stable. The timing accuracy is also improved by sending the beacon more frequently. For flight tests that require a synchronization of sensor data to sub-millisecond accuracies, a conservative approach would be to provide a synchronization beacon every 20 minutes.

Programmable 2.4 GHz IEEE 802.15.4 frequency agile spread spectrum transceiver 98 with antenna 34 is connected to microprocessor 90 through RS-232 cable 100. Programmable 2.4 GHz IEEE 802.15.4 frequency agile spread spectrum transceiver 98 wirelessly communicates with 2.4 GH RF transceiver 102 which connects to personal computer 104 through USB or RS-232 cable 106. Inclusion of transceiver 98 facilitates use on moving or spinning parts and reduces cost and improves reliability by avoiding wiring extending from instrumented shear pin 20, shear bolt 44 whose contacts are subject to breakage and whose connectors provide a path for moisture ingress. PC 104 and RF transceiver 102 can be replaced by a single WSDA enclosure with an internal RF transceiver and a digital communications link to an internal single board computer running its own operating system, such as Linux. An antenna can be either internal or external to the enclosure.

Chip antenna 34 used in prototype wireless, instrumented shear pin 20 and shear pin bolt 44 is produced by Fractus, S.A., model Fractus® Reach Xtend™ Chip Antenna (P/N: FR05-S1-N-0-001). These small chip antennas enable shear pin bolt 44 to maintain a small size.

In one embodiment, power is obtained from strain energy provided to piezoelectric material 110 as the structure vibrates, as illustrated in FIGS. 5a, 5b, and FIG. 6. From there power goes to rectifier and energy management circuit 112, as described in commonly assigned U.S. patent application Ser. No. 10/379,223, incorporated herein by reference. In one embodiment, energy harvesting is used to background recharge batteries, and sufficient power is stored to enable operation for a reasonable amount of time, even though ambient energy levels may have diminished or reduced to zero, for example when the aircraft is at rest. If sufficient power has been stored, data can be transmitted by transceiver 98 in the removable instrumented load bearing element or from a network of removable instrumented load bearing elements, after a flight has been completed and the aircraft has landed.

Alternatively, primary batteries can be used. With a strain gauge bridge of 4.7K ohms, typical power consumption is 4 microamps per sample/sec with real time RF transmission, resulting in an average current draw of 1 ma at 250 samples/sec. If a primary battery having 1.7 Amp-hour capacity is used—a capacity consistent with the size of F-18 shear pin's center hole 24—battery life may be estimated at 1700 flight hours at 250 samples/sec; 4,250 hours at 100 samples/sec, and 42,500 hours at 10 samples/sec. For data logging only (i.e, transceiver 98 is off), these flight hours are doubled.

For monitoring aircraft flight control surfaces, one strategy for enhancing battery life during flight is to sample at a relatively slow rate (say 32 Hz) when the aircraft is flying without buffet loads present. In the event that relatively high dynamic buffet loads above a preset threshold are detected, such as by instrumented shear pin 20 and shear pin bolt 44, each instrumented shear pin 20 and shear pin bolt 44 is programmed to increase its sampling rate in order to capture the peak loads associated with higher frequency (about 45 Hz) dynamic buffet loads. To adequately capture loads with frequency content at 45 Hz, for example, a sample rate of 512 Hz or higher is preferable. The program may instruct processor 90 to initiate data recording, including load measurements, time, and duration of the high dynamic loads. Once high loads are no longer detected, the program may reduce the sampling rate back to the slow rate.

For example, an aircraft may spend about 3 to 5% of its time in maneuvers or subject to gusts that could generate loading. An energy harvesting system would benefit from this energy savings approach. The harvester would automatically implement background recharging of the battery when the energy consumption levels are low. During buffeting, instrumented shear pin 20 and shear pin bolt 44 would make full use of the available energy as well as the stored energy to support higher sample rates, such as 512 Hz.

The +2.5 V DC regulated bridge excitation provided to Wheatstone bridge 80, 80' is multiplexed & pulsed under control of microprocessor 90 through voltage regulator 113 to conserve energy. In one embodiment, when the aircraft is not flying, to save energy, microprocessor 90 sleeps and power to strain gauges 30 and other electronic components is turned off or substantially reduced. Microprocessor 90 periodically wakes and checks accelerometers for vibration showing that the airplane is running, and if the airplane is running microprocessor 90 provides sampling at a preprogrammed sample rate for that application. Microprocessor 90 still only powers Wheatstone bridge 80 and signal conditioning circuits during samples to save energy. Microprocessor 90 can also sleep between samples.

Applicants tested modules containing the electronic circuits to MIL-STD-810F. and the modules passed thermal shock, thermal soak, vibration, and centrifuge tests. These modules feature wireless strain gauge offset/gain adjust, wireless control of sample rates to 2 KHz, wireless shunt calibration, and low temperature coefficients (offset: −0.007%, span: 0.015%).

A/D resolution for a half bridge installations measured by applicant was measured at +/−3 bits, with a strain sensitivity of ~0.3 microstrain per bit. Removable instrumented load bearing elements, such as wireless instrumented shear pin 20 or shear pin bolt 44 may use a full bridge, so they could achieve a sensitivity of about 0.15 microstrain per bit, or +/−0.6 microstrain.

Figure 8:
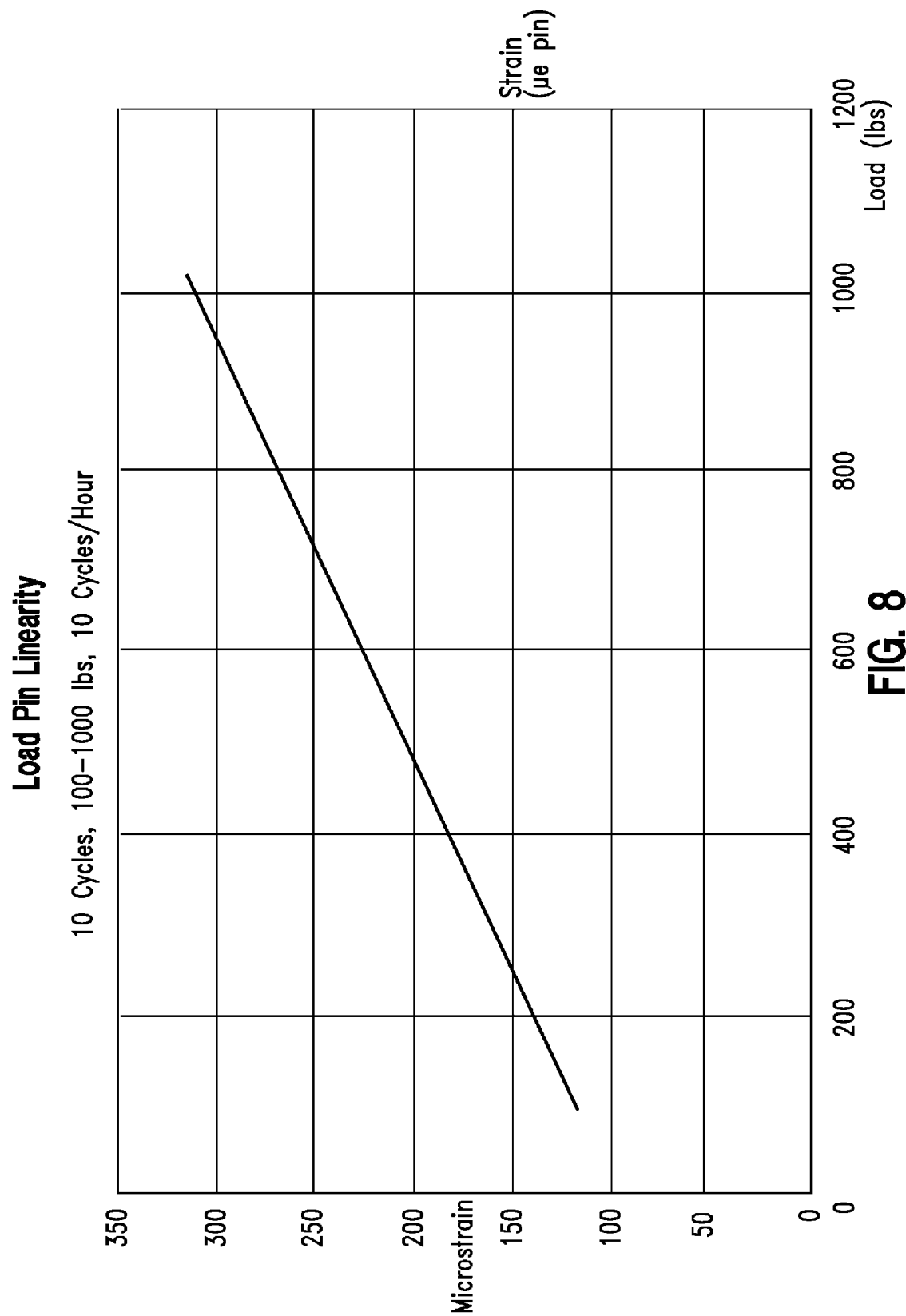
FIG. 8 is a graph with data showing strain vs. load.

Applicants have produced prototype wireless, instrumented shear pin bolts 44 for testing purposes in a wide range of sheer pin sizes. The average nonlinearity of these prototypes was found to be +/−0.44%, standard deviation was 0.32%. A typical plot of the data from these is shown in FIG. 8. Even more accuracy can be obtained by correcting for this non-linearity by burning a memory with the coefficients determined from such a test.

Testing of the wireless portion of the prototype wireless, integrated shear pins in an aircraft yielded strong signal reception and transmission. Eight wireless links were established between two base stations and four transceiver nodes. A test loop of 500 bi-directional 'ping' packets was used to measure the quality of each link, with software recording packet success rate and median received signal strength (RSSI). Each of the eight links delivered 500 out of 500 pings successfully for 100% success rate. The median RSSI for each link was between −43 dBm and −59 dBm with the transmission distances between 9" and 53". The receive sensitivity of the MicroStrain radios is approximately −90 dBm, leaving approximately 30 dB of link margin for the weakest node tested.

A second test was performed to characterize the signal quality through an aircraft structure which required transmission through panels fabricated of composite material laced with copper wire (lightning protection material). In addition, the area was populated with various other materials, mechanicals and electro-mechanicals that could have diminished performance. Given these conditions, the antennae performed with 100% success up to 65 feet (20 m).

Alternatively, a coaxial cable leading to a built in antenna or to an external antenna may be used should the application warrant it.

A removable instrumented load bearing element, such as wireless instrumented shear pin 20 or shear pin bolt 44, can provide real time streaming to an on-vehicle data collection unit, such as the WSDA. Alternatively, data can be stored locally in embedded flash memory 94. Real time streaming is useful for in-flight diagnostics, and for data aggregation with other wireless and hard-wired (networked) sensors. Local data storage to embedded flash memory 94 is useful for flight tests where data can be downloaded after the flight is completed. In this embodiment data transmission during flight can be avoided.

Figure 9:
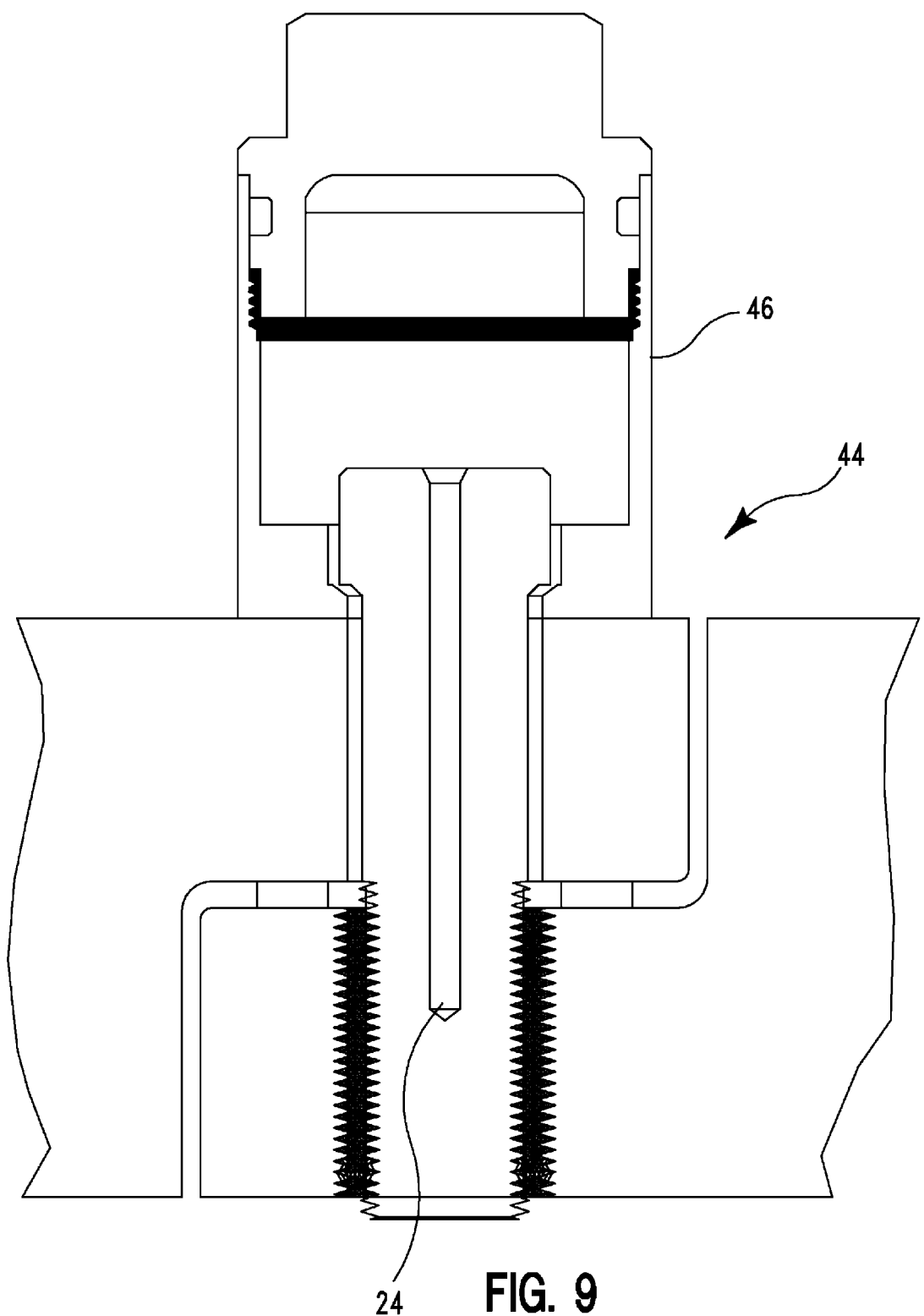
FIG. 9 is a cross sectional view of a lap joint with an instrumented shear pin.

In addition to measuring shear loads, the removable instrumented load bearing element, such as wireless instrumented shear pin 20 or shear pin bolt 44, could incorporate additional strain gauges to provide additional structural load outputs, and a technique for calibration of such a multiple degree of freedom load cell has been described in U.S. Pat. No. 7,188, 535, "Load cell having strain gauges of arbitrary location," incorporated herein by reference. The removable instrumented load bearing element with sensors measuring multiple degrees of freedom, such as three orthogonal moments and three orthogonal forces, can be used as a "smart bolt" to monitor the loads and bending moments on fasteners for applications, such as monitoring the loads on bolted lap joints, as shown in FIG. 9. The smart bolt can measure axial loads, shear loads, bending loads, and torsional loads. A calibration process is described in the '535 patent.

Figure 10:
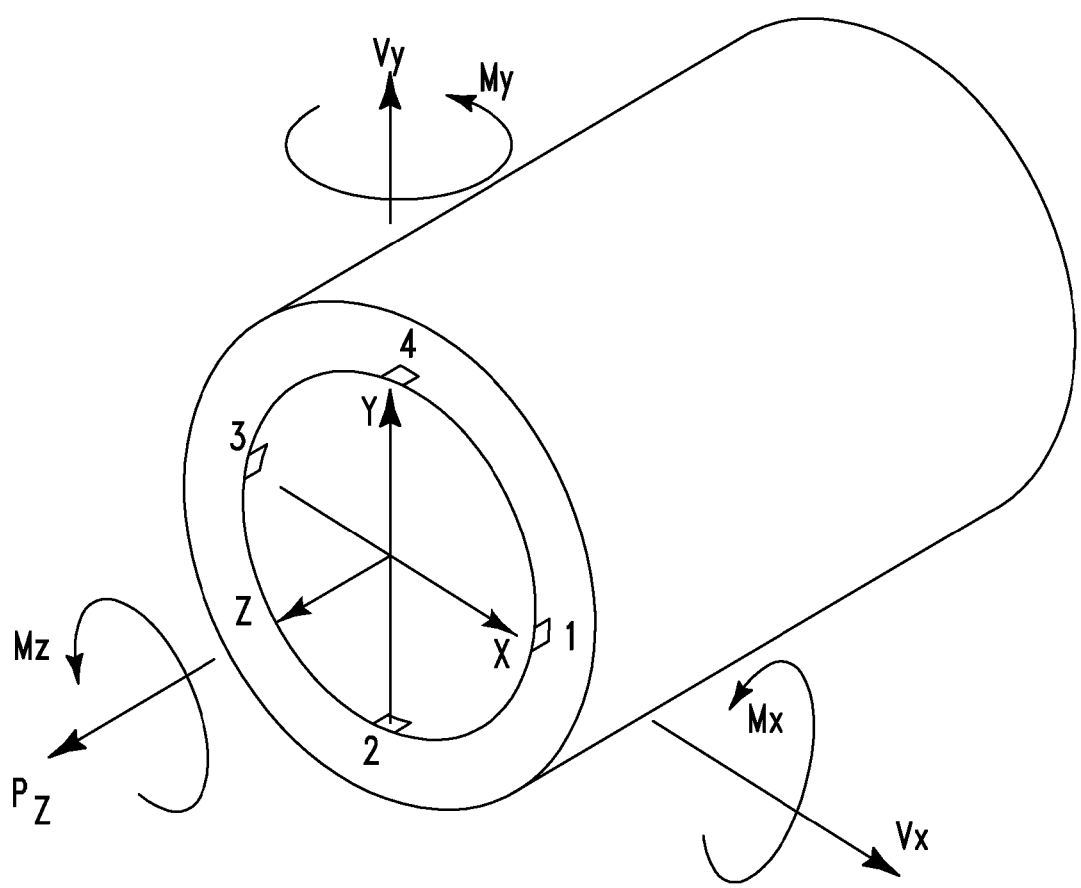
FIG. 10 is a three dimensional view of a shear pin showing four locations for strain gauge placement for shear load measurement.

The present applicants performed a theoretical analysis of a removable instrumented load bearing element to show that shear loads may be amplified while bending loads may be cancelled for shear type loading applications. For an F-18 wireless instrumented shear pin (clevis) the present applicants found that they could measure applied shear loads along the X and Y axes of wireless instrumented shear pin 20, as shown in FIG. 10. They found that they could make these measurements accurately even when wireless instrumented shear pin 20 was additionally exposed to various off-axis loads from various sources.

Significant off-axis loading is expected in the form of moments about the X and Y axes that arise due to imperfections in the shear joint geometry. Typically, small gap 120 will be present between the shear joint's member 122 (coming out of or going into the page) and yoke 124, as shown in FIG. 3*a*. A shear load acting across the width of gap 120 will give rise to such a moment load. The magnitude of these moments is sensitive to the width of gap 120, as well as to non-linearities of surface contact 126 between wireless instrumented shear pin 20, member 122 and yoke 124. Therefore, the magnitude of moments may be expected to be widely variable and unpredictable between installations. The present applicants recognized that canceling the effects of such moments could be accomplished by judicious placement of strain gauges within center hole 24 in wireless instrumented shear pin 20.

Applicants recognized that torque about the longitudinal (Z) axis of the removable instrumented load bearing element can be generated as a result of contact friction between wireless instrumented shear pin 20, member 122 and yoke 124 in combination with the resultant shear load rotating in the X-Y plane. Axial compression can be applied as a result of friction, as well as from the fasteners used to hold wireless instrumented shear pin 20 in place.

Applicants found that they could cancel the effects of such moments by placing strain gages 30 at four locations around inner wall 26 of center hole 24 of wireless instrumented shear pin 20, on the shear face (the location in the shear pin where shear strains are concentrated), as shown in FIG. 10. Two overlapping strain gages 30 are placed at each location, one oriented at +45 degrees with respect to the axis of wireless instrumented shear pin 20 and the other oriented at −45 degrees with respect to that axis. The magnitude of the surface stresses at gage location can be estimated using a number of simplifying assumptions:

1. Linear elastic system.
2. Poisson effects are ignored.
3. For the purpose of shear stress estimation, the removable instrumented load bearing element is considered to be "thin-walled."

The resulting stress estimates shown in FIG. 11 are accurate only to first order since second and higher order effects are ignored. High accuracy is not needed, however, since the goal here is only to identify a favorable strain gage placement strategy. Applicants found that such placement leads to canceling the effects of the moments and torsion.

A full-bridge circuit can be formed to directly sense the applied shear load, Vx, using gages G3, G4, G7 and G8. The bridge output voltage, $B_x$, is $$B_x = v_{in} \cdot G \cdot [(\epsilon_{G8} - \epsilon_{G7}) - (\epsilon_{G3} - \epsilon_{G4})]$$

where $v_{in}$ is the bridge excitation voltage and G is the gage factor. Substituting from FIG. 12 gives, $$B_x = v_{in} \cdot G \cdot \left\{ \begin{bmatrix} \frac{1}{E}\left(\frac{1}{2}\frac{P_Z}{A} + \frac{1}{2}\frac{M_x r}{I} - \frac{2V_x}{A} + \frac{M_z}{rA}\right) - \\ \frac{1}{E}\left(\frac{1}{2}\frac{P_Z}{A} + \frac{1}{2}\frac{M_x r}{I} + \frac{2V_x}{A} - \frac{M_z}{rA}\right) \end{bmatrix} - \begin{bmatrix} \frac{1}{E}\left(\frac{1}{2}\frac{P_Z}{A} - \frac{1}{2}\frac{M_x r}{I} + \frac{2V_x}{A} + \frac{M_z}{rA}\right) - \\ \frac{1}{E}\left(\frac{1}{2}\frac{P_Z}{A} - \frac{1}{2}\frac{M_x r}{I} - \frac{2V_x}{A} - \frac{M_z}{rA}\right) \end{bmatrix} \right\}$$

which simplifies to $$B_x = -v_{in} \cdot G \cdot \left[\frac{8V_x}{EA}\right]$$

Note that the X bridge output is sensitive to the X shear load only. It inherently rejects all moment loading including axial torque, as well as axial tension/compression.

A similar bridge can be formed using gages G1, G2, G5 and G6 to provide an output, $B_y$, sensitive to the applied shear load in the Y direction, $$B_y = v_{in} \cdot G \cdot \left[\frac{8V_y}{EA}\right].$$

Sensor output and operational load range of wireless instrumented shear pin 20 may be adapted by adjusting the inside diameter of center hole 24 of the removable instrumented load bearing element as well as the characteristics chosen for the electrical components and strain gauges. A larger center hole 24 will provide less strength and more strain. The present applicants have produced removable instrumented load bearing elements with center hole diameters as small as 0.094".

As one example, in typical flight, the loads on each F-18 clevis joint may be approximately 30,000 lb. Estimates of the other system values are shown below.

$v_{in}$=3 Volts
G=2.2
$V_x$=15,000 Lb (30,000 lbs on clevis joint, equally divided between 2 shear faces)
E=29×10$^6$ Lb/in$^2$
A=2.5 in$^2$ The output of Wheatstone bridge 80 under these conditions will be approximately 11 mV. Using gain of 100 for amplifier 84 in combination with data acquisition systems similar in design to existing commercial products, a load resolution on the order of 50 lbs may be achieved while providing a full scale measurement range of +/−50,000 lb.

In the ideal case, Wheatstone bridge circuits identified above in X and Y directions will provide outputs which are independent of one-another, and with the sensitivities identified. In the real system, however, various material and geometric imperfections and non-linearities will cause the bridge outputs to deviate from the ideal case. A factory or laboratory calibration procedure is carried out to determine the true system output as a function of applied clevis load. This calibration information is then used within the microelectronic's embedded processor to provide compensation for non-linearities and other repeatable errors that are specific to each removable instrumented load bearing element. Furthermore, the calibration is performed at various temperatures, and these data are used to compensate for errors in removable instrumented load bearing element's load measurement due to the effect of temperature on sensitivity (gain) and zero output (offset).

For calibration (or periodic re-calibration), the removable instrumented load bearing element is installed in a test fixture. Uniaxial loads are applied using a materials test machine. Between tests, the removable instrumented load bearing element is rotated in the fixture such that the load axis is oriented with the pins' X axis, and Y axis in successive tests. Standard least squares fit of the bridge output vs. the known load input is used to identify each bridge's scale factor.

While the disclosed methods and systems have been shown and described in connection with illustrated embodiments, various changes may be made therein without departing from the spirit and scope of the invention as defined in the appended claims.

What is claimed is:

1. A device, comprising a removable load bearing element, wherein said removable load bearing element includes a load sensor, a pin portion and a housing portion, wherein said pin portion extends from said housing portion, wherein said pin portion includes said load sensor, wherein said housing portion includes an electronic circuit connected to said load sensor, wherein said electronic circuit includes a device for receiving a signal derived from said load sensor, wherein said housing portion includes said device for receiving said signal, wherein said pin portion includes a first aperture, wherein said first aperture has a first inner wall, and wherein said load sensor is mounted on said first inner wall.

2. A device as recited in claim 1, wherein said housing includes a second aperture, wherein said first aperture has a first diameter, wherein said second aperture has a dimension extending in a direction parallel to said first diameter, wherein said dimension is larger than said first diameter.

3. A device as recited in claim 1, wherein said electronic circuit includes a device for processing load sensor output, wherein said housing portion includes said device for processing load sensor output.

4. A device as recited in claim 3, wherein said electronic circuit further includes a wireless transceiver and a power supply, wherein said housing portion includes said wireless transceiver and said power supply.

5. A device as recited in claim 4, wherein said power supply includes a battery.

6. A device as recited in claim 4, wherein said power supply includes an energy harvesting device.

7. A device as recited in claim 3, wherein said electronic circuit further includes a non volatile memory, wherein said non-volatile memory includes coefficients for compensating load sensor output for temperature, wherein said housing portion includes said non volatile memory.

8. A device as recited in claim 1, wherein said electronic circuit includes an orientation sensor, wherein said housing portion includes said orientation sensor.

9. A device as recited in claim 1, further comprising a first line, wherein said load sensor provides a sensor signal along said first line.

10. A device as recited in claim 9, further comprising a second line, wherein said electronic circuit provides a load sensor excitation along said second line.

11. A device as recited in claim 1, wherein said load sensor includes a strain gauge.

12. A device as recited in claim 11, wherein said load sensor includes a plurality of strain gauges.

13. A device as recited in claim 12, wherein said plurality of strain gauges are arranged to measure different kinds of loads.

14. A device as recited in claim 13, wherein said different kinds of loads include at least one from the group consisting of forces directed along orthogonal axes, moments directed about orthogonal axes, forces applied at different locations, moments about different locations.

15. A device as recited in claim 11, wherein said load sensor includes stacked strain gauges.

16. A device as recited in claim 4, wherein said electronic circuit includes a precision timekeeper, wherein said wireless transceiver is configured for wirelessly receiving a beacon that provides a periodic timing reference, wherein said wireless transceiver is connected for providing a signal derived from the beacon to said precision timekeeper for synchronizing said precision timekeeper to the beacon, wherein said wireless transceiver is connected for wirelessly transmitting data derived from said load sensor.

17. A structure as recited in claim 16, wherein said precision timekeeper is connected to provide a time stamp to data from said load sensor.

18. A device as recited in claim 16, further comprising a structure, a plurality of structural elements of the structure, and a plurality of said removable load bearing elements, wherein said structural elements are held together by said removable load bearing elements, wherein said clock synchronizing provides time synchronized data acquisition from said load sensors in said plurality of removable load bearing elements, wherein said wirelessly transmitted data from said plurality of removable load bearing elements is sufficiently time synchronized so said wirelessly transmitted data from said plurality of removable load bearing elements can be combined for calculating a load experienced by said structure.

19. A structure as recited in claim 18, further comprising a receiving unit separate from said plurality of removable load bearing elements, wherein said receiving unit includes a receiving unit transceiver and a computing device, wherein said receiving unit transceiver is configured for receiving said wirelessly transmitted data from said plurality of removable load bearing elements, wherein said computing device is connected for said combining data from said plurality of removable load bearing elements for calculating the loads experienced by the structure.

20. A structure as recited in claim 19, wherein said beacon is transmitted by said receiving unit transceiver.

21. A structure as recited in claim 16, wherein said electronic circuit includes a device for processing load sensor output, wherein said precision timekeeper is connected to said device for processing load sensor output to provide a timing reference to enable said device for processing load sensor output to schedule data collection.

22. A structure as recited in claim 16, wherein said electronic circuit includes a device for processing load sensor output, wherein said precision timekeeper is connected to said device for processing load sensor output to provide a timing reference to enable said device for processing load sensor output to schedule data transmission.

* * * * *